United States Patent
Satou et al.

(10) Patent No.: US 11,863,910 B2
(45) Date of Patent: Jan. 2, 2024

(54) TASK SUPPORT APPARATUS, TASK SUPPORT PROGRAM, TERMINAL, AND TASK SUPPORT METHOD

(71) Applicant: DAIKIN INDUSTRIES, LTD., Osaka (JP)

(72) Inventors: Daisuke Satou, Osaka (JP); Tomomi Kukita, Osaka (JP); Tatsuya Shouji, Osaka (JP); Hiroki Ueda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/905,085

(22) PCT Filed: Feb. 22, 2021

(86) PCT No.: PCT/JP2021/006566
§ 371 (c)(1),
(2) Date: Aug. 26, 2022

(87) PCT Pub. No.: WO2021/177066
PCT Pub. Date: Sep. 10, 2021

(65) Prior Publication Data
US 2023/0009056 A1 Jan. 12, 2023

(30) Foreign Application Priority Data

Mar. 3, 2020 (JP) .................................. 2020-035932
Mar. 3, 2020 (JP) .................................. 2020-035935

(51) Int. Cl.
*H04N 7/18* (2006.01)
*H04N 23/68* (2023.01)
(Continued)

(52) U.S. Cl.
CPC ........... *H04N 7/183* (2013.01); *H04N 23/633* (2023.01); *H04N 23/682* (2023.01); *G06Q 50/08* (2013.01)

(58) Field of Classification Search
CPC ............... H04N 7/183; H04N 5/23264; H04N 5/232939; G06Q 50/08
(Continued)

(56) References Cited

U.S. PATENT DOCUMENTS 9,001,116 B2 * 4/2015 Ben-David ............. G06T 17/05
345/419
10,163,173 B1 * 12/2018 McKinley ............. G06F 3/0484
(Continued)

FOREIGN PATENT DOCUMENTS

JP 2001-320621 11/2001
JP 2002-092082 3/2002
(Continued)

OTHER PUBLICATIONS

International Search Report for PCT/JP2021/006566 dated May 11, 2021.
(Continued)

*Primary Examiner* — Thai Q Tran
*Assistant Examiner* — Stephen R Smith
(74) *Attorney, Agent, or Firm* — IPUSA, PLLC

(57) ABSTRACT

The workload in creating a document for reporting a construction status is reduced. A task support apparatus includes a first acquiring unit configured to acquire a plurality of captured images associated with pieces of attribute information from a terminal device configured to associate the captured images with the pieces of attribute information; a second acquiring unit configured to acquire an insertion rule and/or a description rule of a document for reporting a construction status; and a generating unit configured to
(Continued)

generate image information based on the pieces of attribute information, associated with the plurality of captured images acquired by the first acquiring unit, and the insertion rule and/or the description rule acquired by the second acquiring unit. The pieces of attribute information each include a construction detail and a photographing timing.

6 Claims, 25 Drawing Sheets

(51) Int. Cl.
      *H04N 23/63*     (2023.01)
      *G06Q 50/08*     (2012.01)

(58) Field of Classification Search
      USPC .......................................................... 348/143
      See application file for complete search history.

(56) References Cited

U.S. PATENT DOCUMENTS

| | | | |
|---|---|---|---|
| 11,232,685 B1 * | 1/2022 | Nixon | H04N 23/60 |
| 2018/0012103 A1 * | 1/2018 | Harada | G06F 18/24 |

FOREIGN PATENT DOCUMENTS

| | | |
|---|---|---|
| JP | 2002-297693 | 10/2002 |
| JP | 2003-046849 | 2/2003 |
| JP | 2005-051665 | 2/2005 |
| JP | 2005-229388 | 8/2005 |
| JP | 2006-146682 | 6/2006 |
| JP | 2013-125535 | 6/2013 |
| JP | 2018-147215 | 9/2018 |

OTHER PUBLICATIONS

International Preliminary Report on Patentability for PCT/JP2021/006566 dated Sep. 15, 2022.
Extended European search report for EP21764788.2 dated Oct. 6, 2023.
Supplementary Partial European Search Report for 21764788.2 dated Jul. 3, 2023.

* cited by examiner

FIG.2

| ITEM | CONTENTS |
|---|---|
| | FINALIZED DOCUMENT |
| 1 | COVER |
| 2 | DEVICE DELIVERY DOCUMENT |
| 3 | INSTRUCTION MANUAL |
| 4 | COMPLETION DRAWING |
| 5-1 | AIR CONDITIONER TEST OPERATION TABLE |
| 5-2 | AIRTIGHTNESS TEST RESULT TABLE |
| 5-3 | WATER FLOW TEST RESULT TABLE |
| 5-4 | AIRFLOW VOLUME MEASUREMENT TEST COMPARISON TABLE |
| 6 | CONSTRUCTION PHOTOGRAPH LEDGER |
| 7 | FACILITY MANAGEMENT LEDGER |
| 8 | GUARANTEE FORM |
| 9 | MAINTENANCE CONTACT LIST |

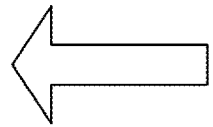

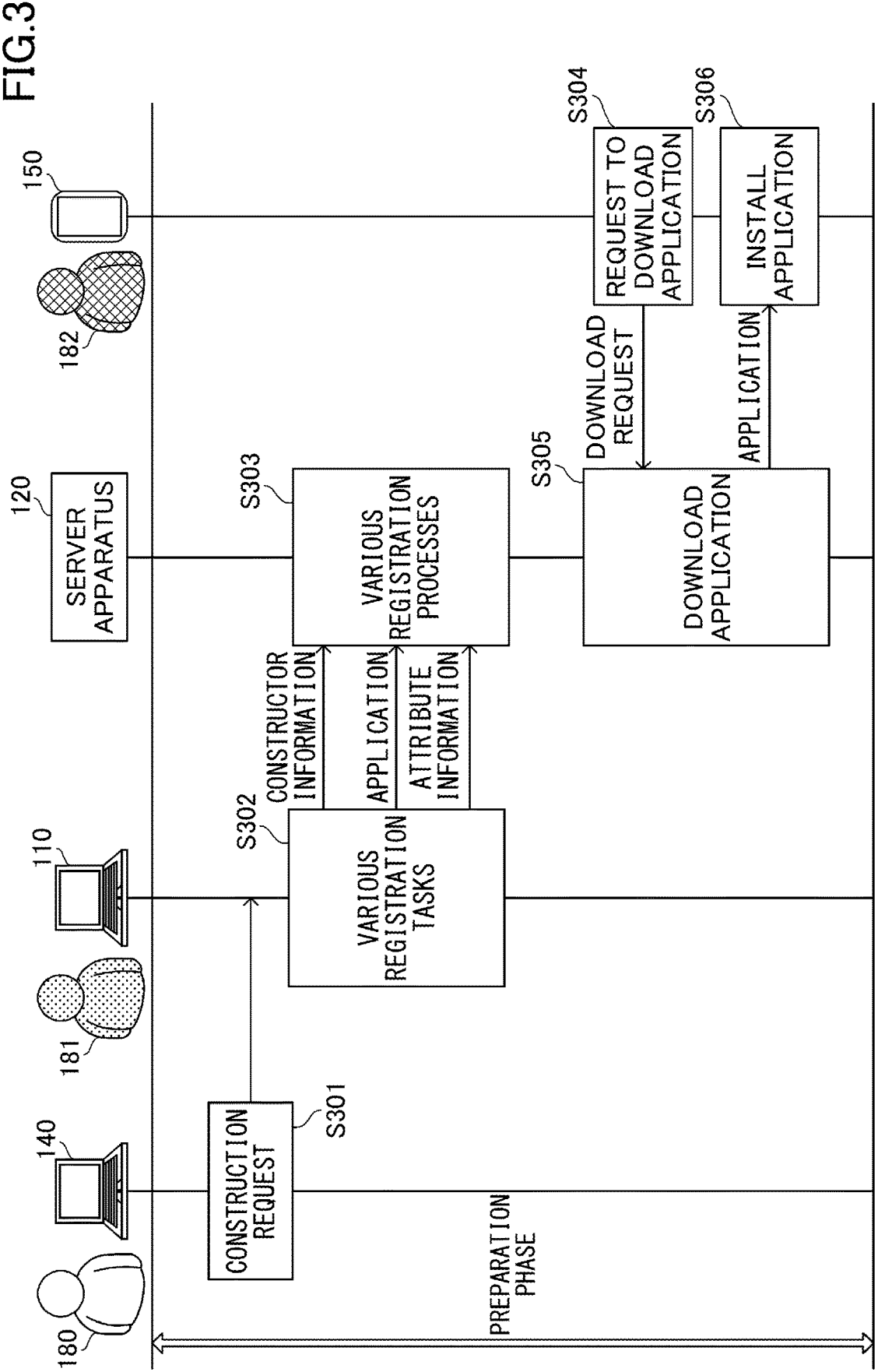

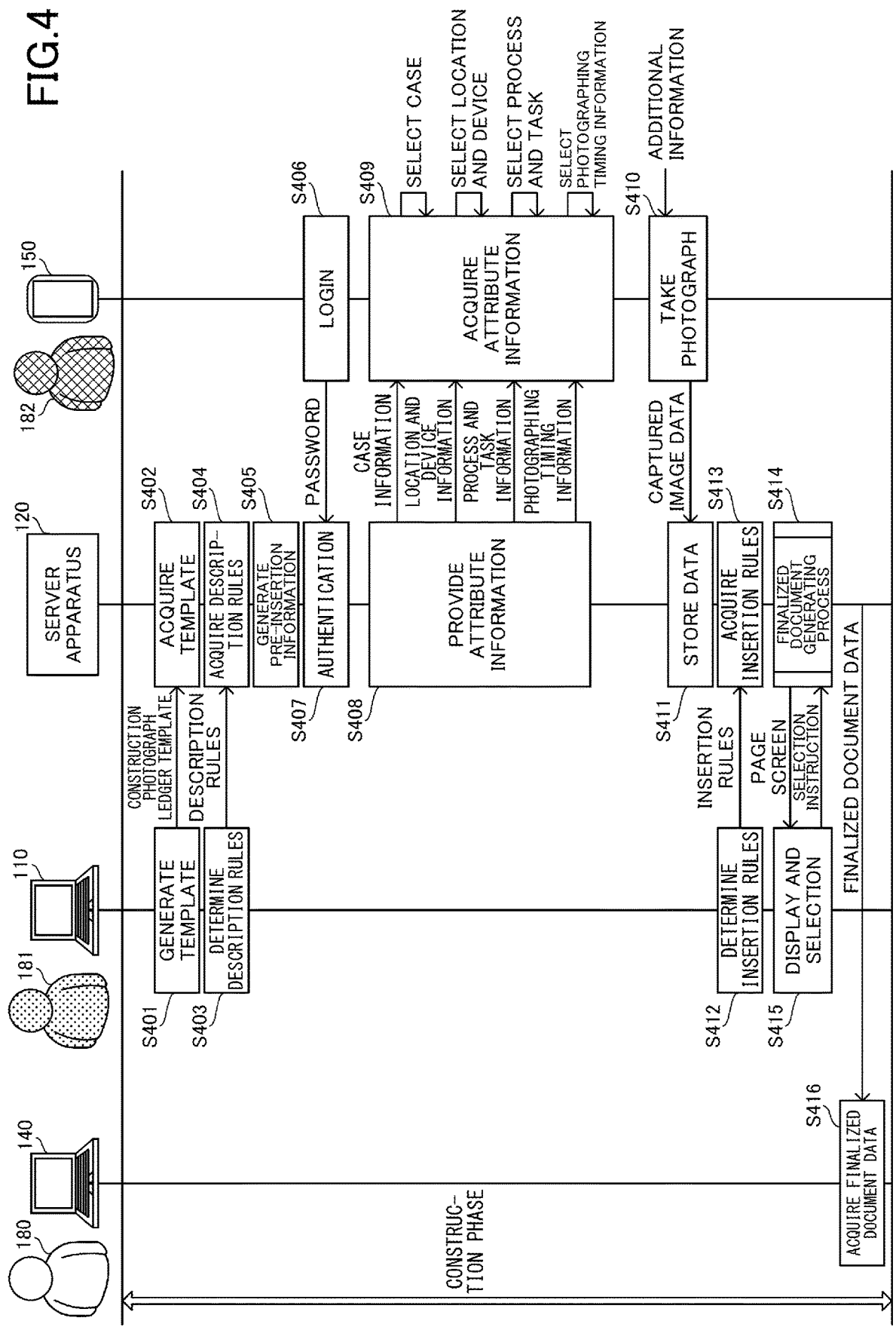

FIG.6

6a — 610 CONSTRUCTOR INFORMATION

| CONSTRUCTOR ID | CONSTRUCTOR NAME | ADDRESS | CONTACT | CONSTRUCTION SUPERVISOR | USER ID | PASSWORD |
|---|---|---|---|---|---|---|
| | | | | | | |
| | | | | | | |
| | | | | | | |

6b — 620 APPLICATION INFORMATION

| APP ID | APP NAME | TYPE | VERSION | UPDATED DATE AND TIME | STORAGE URL |
|---|---|---|---|---|---|
| | | | | | |
| | | | | | |
| | | | | | |

CASE INFORMATION 710

| PROPERTY NAME | CASE ID | CASE NAME | REQUESTER | RESPONSIBLE PERSON | DETAILED INFORMATION | CONTRACTOR |
|---|---|---|---|---|---|---|
| | | AAA | | | | |
| | | BBB | | | | |

7a

LOCATION AND DEVICE INFORMATION 720

| LOCATION AND DEVICE GROUP | 1 | 2 | 3 | ... | m |
|---|---|---|---|---|---|
| FLOOR | NORTH BUILDING FIRST FLOOR | NORTH BUILDING FIRST FLOOR | NORTH BUILDING FIRST FLOOR | ... | NORTH BUILDING OUTSIDE ON EAST SIDE |
| ROOM/ZONE | FIRST GRADE, CLASS 1 | FIRST GRADE, CLASS 2 | HOME ECONOMICS ROOM | ... | OUTDOOR UNIT INSTALLATION PLACE |
| LOCATION | ATTIC | ATTIC | ATTIC | ... | |
| SYSTEM | SYSTEM A | SYSTEM A | SYSTEM A | ... | SYSTEM A |
| DEVICE | FFF001DD | FFF010DD | FFF002DD | ... | RRR100F |

7b-1

PROCESS AND TASK INFORMATION 730

| PROCESS AND TASK GROUP | 1 | 2 | 3 | ... | n |
|---|---|---|---|---|---|
| PROCESS | CONSTRUCTION WORK | TEST | CONSTRUCTION WORK | ... | TEST |
| TASK | INDOOR UNIT INSTALLATION | WATER FLOW PASSING TEST | REFRIGERANT PIPE LAYING | ... | AIRTIGHTNESS TEST |

7b-2

PHOTOGRAPHING TIMING INFORMATION 740

| BEFORE OPERATION | DURING OPERATION | AFTER OPERATION |
|---|---|---|

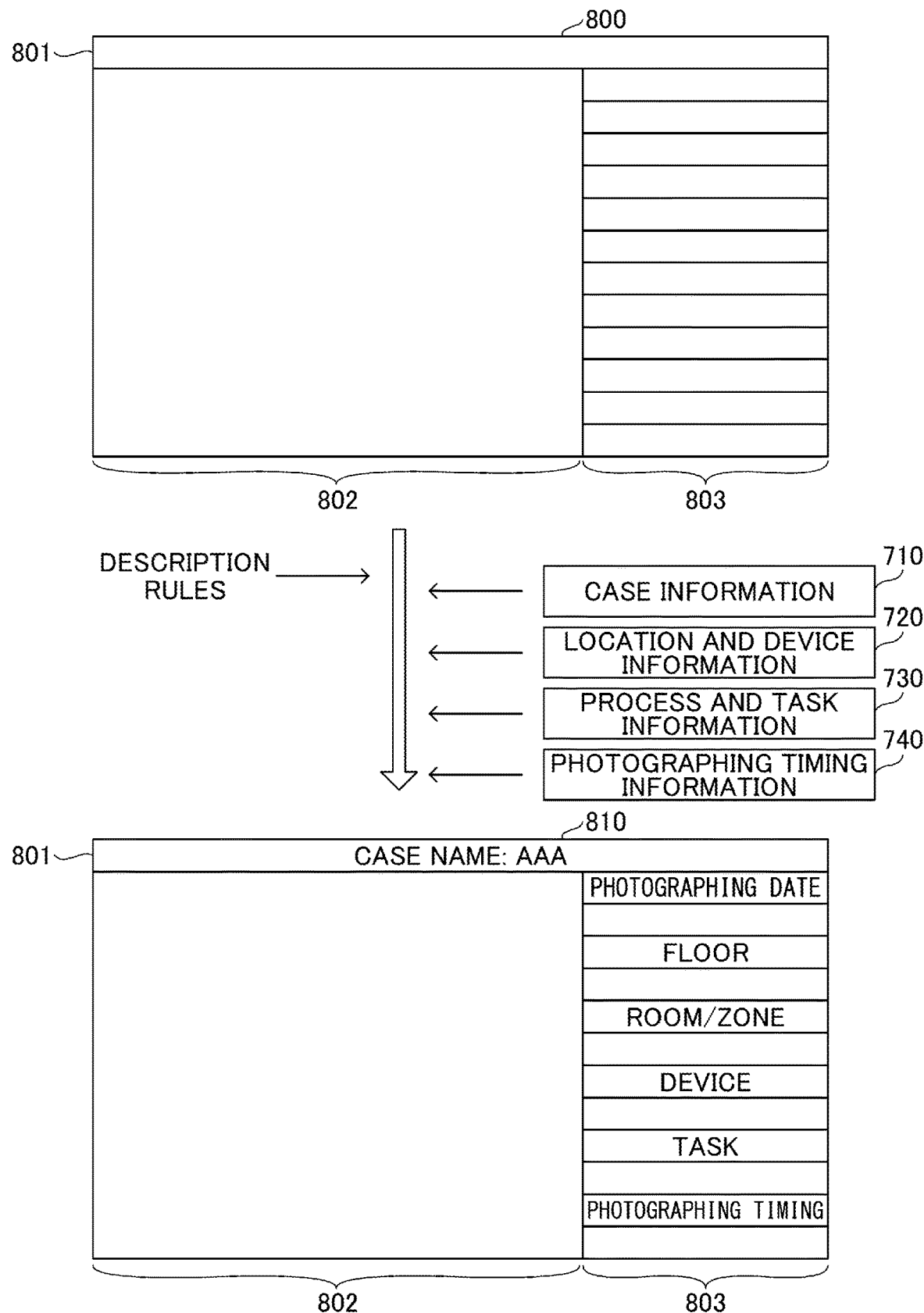

FIG.26

<FORMAT A>

| POSITION INFORMATION | | NECESSITY TO CAPTURE IMAGE DATA |
|---|---|---|
| ROOF/CEILING | BEFORE CONSTRUCTION | REQUIRED |
| ROOF/CEILING | DURING CONSTRUCTION | REQUIRED |
| ROOF/CEILING | AFTER CONSTRUCTION | REQUIRED |
| AIR CONDITIONING EQUIPMENT (HEAT SOURCE EQUIPMENT) | BEFORE CONSTRUCTION | REQUIRED |
| AIR CONDITIONING EQUIPMENT (HEAT SOURCE EQUIPMENT) | DURING CONSTRUCTION | REQUIRED |
| AIR CONDITIONING EQUIPMENT (HEAT SOURCE EQUIPMENT) | AFTER CONSTRUCTION | REQUIRED |
| AIR CONDITIONING EQUIPMENT + LIGHTING EQUIPMENT | BEFORE CONSTRUCTION | REQUIRED |
| AIR CONDITIONING EQUIPMENT + LIGHTING EQUIPMENT | DURING CONSTRUCTION | REQUIRED |
| AIR CONDITIONING EQUIPMENT + LIGHTING EQUIPMENT | AFTER CONSTRUCTION | REQUIRED |

<FORMAT B>

| POSITION INFORMATION | | NECESSITY TO CAPTURE IMAGE DATA |
|---|---|---|
| ROOF/CEILING | BEFORE CONSTRUCTION | NOT REQUIRED |
| ROOF/CEILING | DURING CONSTRUCTION | NOT REQUIRED |
| ROOF/CEILING | AFTER CONSTRUCTION | NOT REQUIRED |
| AIR CONDITIONING EQUIPMENT (HEAT SOURCE EQUIPMENT) | BEFORE CONSTRUCTION | REQUIRED |
| AIR CONDITIONING EQUIPMENT (HEAT SOURCE EQUIPMENT) | DURING CONSTRUCTION | REQUIRED |
| AIR CONDITIONING EQUIPMENT (HEAT SOURCE EQUIPMENT) | AFTER CONSTRUCTION | REQUIRED |
| AIR CONDITIONING EQUIPMENT + LIGHTING EQUIPMENT | BEFORE CONSTRUCTION | REQUIRED |
| AIR CONDITIONING EQUIPMENT + LIGHTING EQUIPMENT | DURING CONSTRUCTION | REQUIRED |
| AIR CONDITIONING EQUIPMENT + LIGHTING EQUIPMENT | AFTER CONSTRUCTION | REQUIRED |

<POSITION INFORMATION AND USE INFORMATION>

| POSITION INFORMATION | | NECESSITY TO CAPTURE IMAGE DATA | USE |
|---|---|---|---|
| ROOF/CEILING | BEFORE CONSTRUCTION | REQUIRED | FORMAT A |
| ROOF/CEILING | DURING CONSTRUCTION | REQUIRED | FORMAT A |
| ROOF/CEILING | AFTER CONSTRUCTION | REQUIRED | FORMAT A |
| AIR CONDITIONING EQUIPMENT (HEAT SOURCE EQUIPMENT) | BEFORE CONSTRUCTION | REQUIRED | FORMAT A, FORMAT B |
| AIR CONDITIONING EQUIPMENT (HEAT SOURCE EQUIPMENT) | DURING CONSTRUCTION | REQUIRED | FORMAT A, FORMAT B |
| AIR CONDITIONING EQUIPMENT (HEAT SOURCE EQUIPMENT) | AFTER CONSTRUCTION | REQUIRED | FORMAT A, FORMAT B |
| AIR CONDITIONING EQUIPMENT + LIGHTING EQUIPMENT | BEFORE CONSTRUCTION | REQUIRED | FORMAT A, FORMAT B |
| AIR CONDITIONING EQUIPMENT + LIGHTING EQUIPMENT | DURING CONSTRUCTION | REQUIRED | FORMAT A, FORMAT B |
| AIR CONDITIONING EQUIPMENT + LIGHTING EQUIPMENT | AFTER CONSTRUCTION | REQUIRED | FORMAT A, FORMAT B |

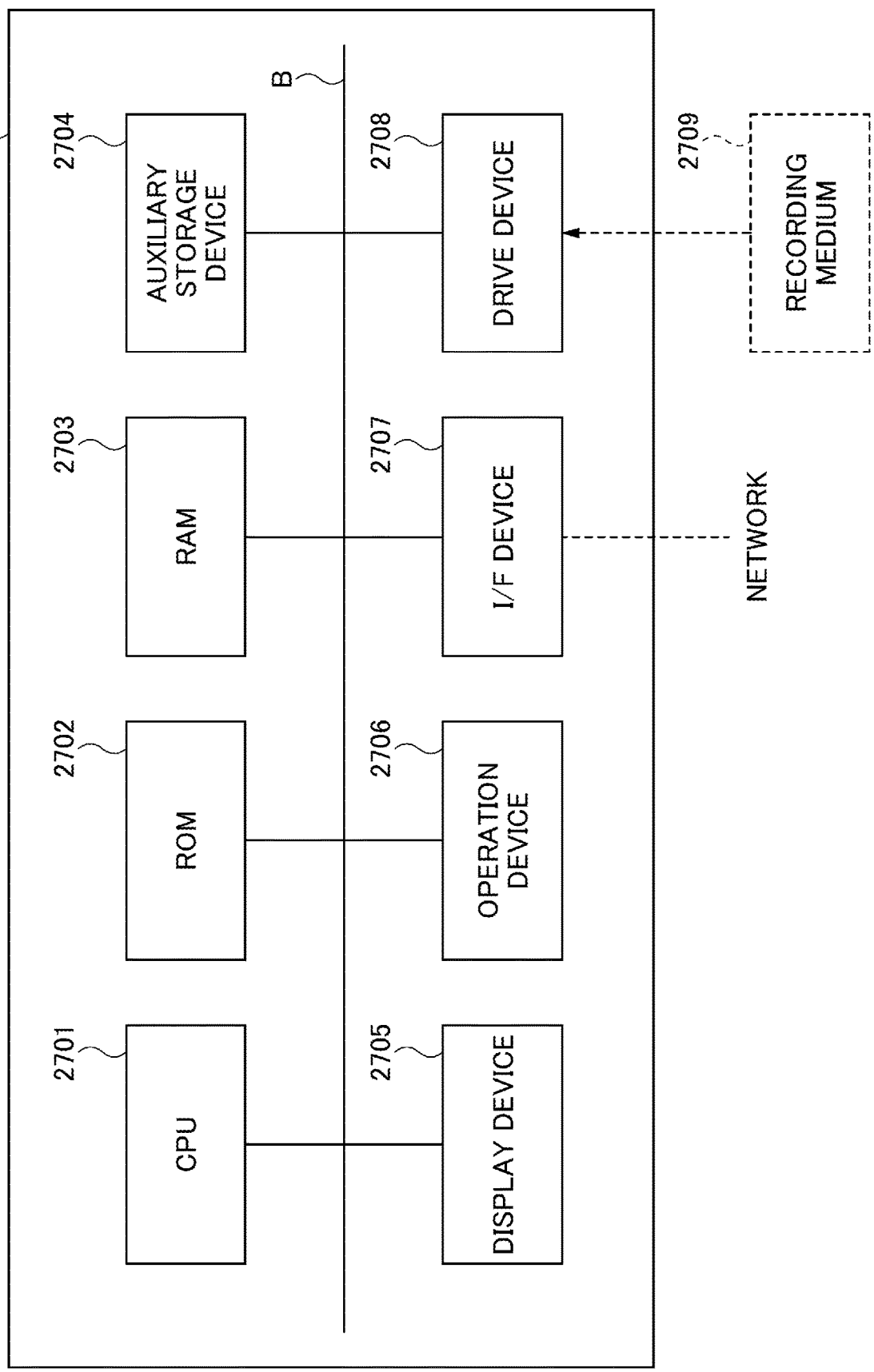

TASK SUPPORT APPARATUS, TASK SUPPORT PROGRAM, TERMINAL, AND TASK SUPPORT METHOD

TECHNICAL FIELD

The present disclosure relates to a task support apparatus, a task support program, a terminal, and a task support method.

BACKGROUND ART

In general, construction photographs are taken at a construction site when various device systems are constructed. The construction photographs taken at this time are included in various documents (for example, a finalized document, and the like) and delivered to a customer.

RELATED-ART DOCUMENTS

Patent Documents

Patent Document 1: Japanese Laid-Open Patent Publication No. 2013-125535
Patent Document 2: Japanese Laid-Open Patent Publication No. 2006-146682
Patent Document 3: Japanese Laid-Open Patent Publication No. 2005-229388

SUMMARY OF THE INVENTION

Problem to be Solved by the Invention

However, as the scale of a device system increases, the number of construction photographs to be taken also increases, and as a result, the workload in creating various documents increases.

The present disclosure provides a task support apparatus, a task support program, a terminal, and a task support method for reducing the workload in creating a document for reporting a construction status.

Means to Solve the Problem

A first aspect of the present disclosure is a task support apparatus including:
  a plurality of captured images associated with pieces of attribute information from a terminal device configured to associate the captured images with the pieces of attribute information that, the pieces of attribute information each including a construction detail and a photographing timing;
  a second acquiring unit configured to acquire an insertion rule and/or a description rule of a document for reporting a construction status; and
  a generating unit configured to generate image information based on the pieces of attribute information, associated with the plurality of captured images acquired by the first acquiring unit, and the insertion rule and/or the description rule acquired by the second acquiring unit.

According to the first aspect of the present disclosure, a task support apparatus for reducing the workload in creating a document for reporting a construction status can be provided.

A second aspect of the present disclosure is the task support apparatus according to the first aspect, wherein the insertion rule includes an insertion order, and the insertion order is determined by the construction detail or the photographing timing included in each of the pieces of attribute information.

A third aspect of the present disclosure is the task support apparatus according to the first aspect or the second aspect, further including a selecting unit configured to select a given captured image from among a plurality of captured images in a case where the plurality of captured images are associated with same attribute information.

A fourth aspect of the present disclosure is the task support apparatus according to the first aspect, wherein each of the pieces of attribute information further includes information for identifying a constructor, information for identifying a photographer, evaluation on a captured image, information for identifying a photographing date and time, and information relating to a construction observer.

A fifth aspect of the present disclosure is the task support apparatus according to the first aspect, further including a providing unit configured to provide the construction detail and the photographing timing to the terminal device, wherein the terminal device includes an imaging unit configured to capture an image.

A sixth aspect of the present disclosure is a task support program for causing a computer to execute a process including:
  a first acquiring process for acquiring a plurality of captured images associated with pieces of attribute information from a terminal device configured to associate the captured images with the pieces of attribute information, the pieces of attribute information each including a construction detail and a photographing timing;
  a second acquiring process for acquiring an insertion rule and/or a description rule of a document for reporting a construction status; and
  a generating process for generating image information based on the pieces of attribute information, associated with the plurality of captured images acquired in the first acquiring process, and the insertion rule and/or the description rule acquired in the second acquiring process.

According to the sixth aspect of the present disclosure, a task support apparatus for reducing the workload in creating a document for reporting a construction status can be provided.

A seventh aspect of the present disclosure is a task support apparatus including:
  a format storage unit configured to store a plurality of types of formats for generating data that constitutes a part of a finalized document, the formats each including position information and use information of image data to be captured and inserted, the position information indicating a photographing location where the image data is to be captured; and
  an information transmitting unit configured to transmit position information and use information about each of pieces of image data to be captured and inserted into a plurality of formats selected from among the plurality of types of formats.

According to the seventh aspect of the present disclosure, a plurality of types of finalized documents can be readily created. Further, position information and use information about captured image data necessary to generate various finalized documents can be indicated.

An eighth aspect of the present disclosure is the task support apparatus according the seventh aspect, wherein each of the formats is a format for generating construction photograph ledger data that constitutes the part of the finalized document.

According to the eighth aspect of the present disclosure, a plurality of types of pieces of construction photograph ledger data can be readily generated.

A ninth aspect of the present disclosure is the task support apparatus according the eighth aspect, wherein the construction photograph ledger data is document data attached to a subsidy application form, and the format for generating construction photograph ledger data is at least one of construction photograph ledger data in a case of a subsidy being provided, construction photograph ledger data in a case of no subsidy being provided, and construction photograph ledger data into which captured image data is yet to be inserted.

According to the ninth aspect of the present disclosure, a finalized document author can refer to at least one of construction photograph ledger data in a case of a subsidy being provided, construction photograph ledger data in a case of no subsidy being provided, and construction photograph ledger data into which captured image data is yet to be inserted.

A tenth aspect of the present disclosure is the task support apparatus according the eighth aspect, wherein the format includes a precaution to be taken when generating the construction photograph ledger data that constitutes the part of the finalized document.

According to the tenth aspect of the present disclosure, a photographer and a finalized document author can recognize precautions to be taken when capturing image data and precautions to be taken generating documents.

An eleventh aspect of the present disclosure is the task support apparatus according to any of the seventh aspect to the tenth aspect, wherein the format storage unit is configured to permit access from a person having permission to access the formats.

According to the eleventh aspect of the present disclosure, information about finalized document formats can be prevented from being leaked to a third party.

A twelfth aspect of the present disclosure is a terminal including an information receiving unit configured to receive position information and use information of each of pieces of image data to be captured and inserted into a plurality of formats selected from among a plurality of types of formats for generating construction photograph ledger data that constitutes a part of a finalized document. The position information indicates a photographing location where each of the pieces of image data is to be captured.

According to the twelfth aspect of the present disclosure, the terminal can receive position information and use information about captured image data necessary to generate a plurality of types of finalized documents.

A thirteenth aspect of the present disclosure is the terminal according to the twelfth aspect, further including a display unit configured to display the use information of each of the pieces of image data to be captured.

According to the thirteenth aspect of the present disclosure, a photographer can recognize the use of image data to be captured.

A fourteenth aspect of the present disclosure is the terminal according to the twelfth aspect or the thirteenth aspect, further including a camera function control unit configured to display a line for determining a position of a photographing object on a photographing screen.

According to the fourteenth aspect of the present disclosure, the photographer is not required to perform an operation for determining the position of the photographing object on the photographing screen.

A fifteenth aspect of the present disclosure is the terminal according to the twelfth aspect or the thirteenth aspect, further including a camera function control unit configured to correct each of the pieces of image data so as to reduce an influence of camera shake when each of the pieces of image data is captured.

According to the fifteenth aspect of the present disclosure, the photographer is not required to perform an operation for preventing camera shake when image data is captured.

A sixteenth aspect of the present disclosure is a task support method including:

a step of transmitting, by a task support apparatus that includes a storage unit configured to store a plurality of types of formats for generating data that constitutes a part of a finalized document, position information and use information of each of pieces of image data to be captured and inserted into a plurality of formats selected from among the plurality of types of formats, the position information indicating a photographing location where each of the pieces of image data is to be captured; and a step of receiving, by a terminal, the position information and the use information.

According to the sixteenth aspect of the present disclosure, a plurality of types of finalized documents can be readily created. Further, position information and use information about captured image data necessary to generate various finalized documents can be indicated.

BRIEF DESCRIPTION OF THE DRAWINGS

FIG. 2 is a diagram illustrating an example configuration of a finalized document;

FIG. 3 is a sequence diagram illustrating a flow of a process performed by the task support system in a preparation phase;

FIG. 4 is a sequence diagram illustrating a flow of a process performed by the task support system in a construction phase;

FIG. 6 is a diagram illustrating examples of constructor information and application information;

FIG. 7 is a diagram illustrating examples of case information, location and device information, process and task information, and photographing timing information;

FIG. 8 is a diagram illustrating a specific example of a process from acquiring a template to generating pre-insertion information;

FIG. 26 is a diagram illustrating specific examples of position information and use information; and FIG. 27 is a diagram illustrating an example of a hardware configuration of each of the photographing terminal, the server apparatus, the registration terminal, and the finalized document creating terminal.

MODE FOR CARRYING OUT THE INVENTION

In the following, embodiments will be described with reference to the accompanying drawings. In the specification and drawings, elements having substantially the same functions or configurations are referred to by the same numerals and the description thereof will not be repeated.

First Embodiment

<System Configuration of Task Support System>

Figure 1:
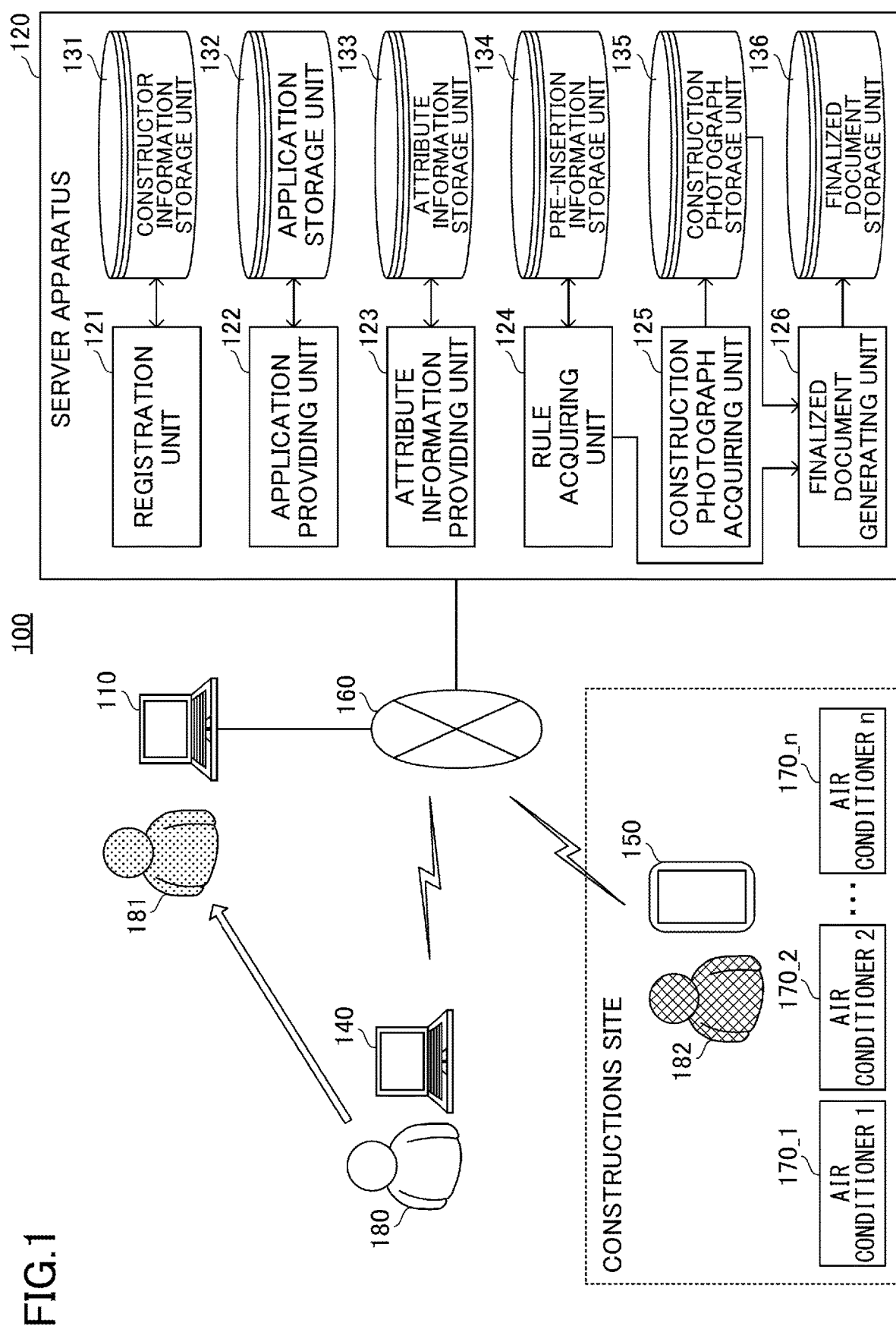
FIG. 1 is a diagram illustrating an example of a system configuration of a task support system.

First, a system configuration of a task support system according to a first embodiment will be described. FIG. 1 is a diagram illustrating an example of a system configuration of a task support system. As illustrated in FIG. 1, a task support system 100 includes an information input apparatus 110, a server apparatus 120, an information output apparatus 140, and a terminal device 150. In the task support system 100, each of the information input apparatus 110, the information output apparatus 140, and the terminal device 150 is communicably connected to the server apparatus 120.

The information input apparatus 110 is an apparatus used by an engineering business operator (hereinafter simply referred to as a "business operator") 181. In response to a request from a customer, the business operator 181 designs a device system. At this time, the business operator 181 inputs "various kinds of information necessary for construction" via the information input apparatus 110. Further, the business operator 181 generates a document for reporting a construction status (referred to as a "finalized document" in the present embodiment), and delivers the document to a customer 180.

Note that, in the present embodiment, a device system to be constructed is described as an air conditioning system, but the device system to be constructed is not limited to the air conditioning system and may be any other device system.

Further, the "various kinds of information necessary for construction" includes information relating to a constructor 182 who actually performs construction at a construction site, and information relating to an application downloaded to the terminal device 150 when the constructor 182 performs the construction at the construction site. Further, the "various kinds of information necessary for construction" includes attribute information relating to the construction of an air conditioning system (hereinafter referred to as "attribute information"), rule information used to generate a finalized document, and the like.

The server apparatus 120 is an example of a task support apparatus, and is configured to support:

a task performed by the business operator 181 to generate a finalized document; and a task performed by the constructor 182 to generate captured image data by taking a construction photograph at a construction site.

A task support program is installed in the server apparatus 120, and the server apparatus 120 is configured to, by executing the program, function as:

a registration unit 121;

an application providing unit 122;

an attribute information providing unit 123;

a rule acquiring unit 124;

a construction photograph acquiring unit 125; and a finalized document generating unit 126.

The registration unit 121 stores information relating to the constructor 182, input by the business operator 181 via the information input apparatus 110, in a constructor information storage unit 131. When the constructor 182 accesses the server apparatus 120 via the terminal device 150, the registration unit 121 refers to the constructor information storage unit 131 and performs an authentication process for the constructor 182.

The application providing unit 122 stores information relating to an application, input by the business operator 181 via the information input apparatus 110, in an application storage unit 132. When the constructor 182 makes a request to download an application via the terminal device 150, the application providing unit 122 downloads the requested application to the terminal device 150.

The attribute information providing unit 123 is an example of a providing unit. The attribute information providing unit 123 stores attribute information, input by the business operator 181 via the information input apparatus 110, in an attribute information storage unit 133. Further, if the registration unit 121 determines that authentication is successful in response to the constructor 182 starting an application and performing a login operation, the attribute information providing unit 123 provides the attribute information to the terminal device 150.

The rule acquiring unit 124 is an example of a second acquiring unit. As rule information input by the business operator 181 via the information input apparatus 110, the rule acquiring unit 124 acquires description rules, in accordance with which description items of attribute information are set when generating a finalized document, and and/or insertion rules, in accordance with which captured image data is inserted into the finalized document.

The description rules are rules that define description items of attribute information to be associated with captured image data when the captured image data is inserted into a finalized document. The captured image data is generated by the constructor 182 taking a photograph at a construction site. The description rules are determined by, for example, the business operator 181. The insertion rules are rules that define the order in which pieces of captured image data are inserted into the finalized document. The insertion rules are determined by, for example, the business operator 181.

The rule acquiring unit 124 inputs description items of attribute information into a finalized document template in accordance with the acquired description rules so as to generate "pre-insertion information", and stores the "pre-insertion information" in the pre-insertion information storage unit 134. The pre-insertion information is information before captured image data is inserted.

The rule acquiring unit 124 indicates the acquired insertion rules and the generated pre-insertion information to the finalized document generating unit 126.

The construction photograph acquiring unit 125 is an example of a first acquiring unit. The construction photograph acquiring unit 125 receives, from the terminal device 150, captured image data generated by the constructor 182 starting an application on the terminal device 150 and taking a construction photograph at a construction site. Further, the construction photograph acquiring unit 125 stores the received captured image data in the construction photograph storage unit 135 as the construction photograph.

Note that attribute information provided by the attribute information providing unit 123 to the terminal device 150 is recorded in the header section of captured image data generated by taking a photograph while the application is running.

The finalized document generating unit 126 is an example of a generating unit and a selecting unit. The finalized document generating unit 126 generates finalized document data when the construction of an air conditioning system is completed. Specifically, the finalized document generating unit 126 retrieves captured image data from the construction photograph storage unit 135 as a construction photograph. Further, the finalized document generating unit 126 generates finalized document data by inserting the retrieved captured image data into pre-insertion information in accordance with the insertion rules.

The finalized document generating unit 126 stores the generated finalized document data in the finalized document storage unit 136. Further, the finalized document generating unit 126 retrieves the finalized document data stored in the finalized document storage unit 136 and sends the finalized document data to the information output apparatus 140, in response to the customer 180 requesting the server apparatus 120 to send the finalized document data via the information output apparatus 140.

The terminal device 150 is a device carried by the constructor 182 at a construction site. The constructor 182 carries the terminal device 150 when constructing an air conditioning system including an air conditioner 1 (reference numeral 170_1) to an air conditioner n (reference numeral 170_n).

The constructor 182 requests the server apparatus 120 to download an application via the terminal device 150, and installs the application, downloaded by the server apparatus 120, in the terminal device 150.

Further, the constructor 182 acquires attribute information from the server apparatus 120 by starting an application on the terminal device 150 and logging into the server apparatus 120. Further, the constructor 182 takes a construction photograph via the started application, and transmits captured image data, generated by taking the construction photograph, via the server apparatus 120.

<Configuration Example of Finalized Document>

Next, an example configuration of a finalized document will be described. FIG. 2 is a diagram illustrating an example configuration of a finalized document. As illustrated in FIG. 2, a finalized document 200 includes a cover, a device delivery document, an instruction manual, a completion drawing, an air conditioner test operation table, an airtightness test result table, a water flow test result table, an airflow volume measurement test comparison table, a construction photograph ledger, a facility management ledger, a guarantee form, a maintenance contact list, and the like.

The server apparatus 120 according to the present embodiment mainly supports:

a task performed by the business operator 181 to generate construction photograph ledger data (image information); and a task performed by the constructor 182 to take a construction photograph at a construction site so as to generate captured image data to be inserted into the construction photograph ledger data.

Therefore, from among various processes performed by the task support system 100, a process related to generation of construction photograph ledger data will be mainly described below.

<Process Flow of Task Support System>

The process related to generation of construction photograph ledger data, performed by the task support system 100, are mainly divided into a preparation phase and a construction phase. The preparation phase and the construction phase will be separately described below.

(1) Flow of Process in the Preparation Phase

First, a flow of a process performed by the task support system 100 in the preparation phase will be described. FIG. 3 is a sequence diagram illustrating a flow of a process performed by the task support system in the preparation phase.

As illustrated in FIG. 3, in step S301, the customer 180 makes a construction request to the business operator 181. The customer 180 may make a construction request to the business operator 181 via a telephone (not illustrated) or via the information output apparatus 140 and the information input apparatus 110.

In step S302, in response to receiving the construction request from the customer 180, the business operator 181 performs registration tasks for registering various kinds of information necessary for construction via the information input apparatus 110. The registration tasks performed by the business operator 181 include a registration task for registering constructor information, a registration task for registering an application, and a registration task for registering attribute information.

In step S303, in response to the business operator 181 performing the registration tasks, the server apparatus 120 registers the constructor information, the application, and the attribute information received from the information input apparatus 110.

Specifically, the registration unit 121 stores the constructor information in the constructor information storage unit 131. The application providing unit 122 stores the application and information relating to the application in the application storage unit 132. Further, the attribute information providing unit 123 stores the attribute information in the attribute information storage unit 133.

In step S304, the terminal device 150 makes a request to download the application based on an instruction from the constructor 182. Specifically, the terminal device 150 sends a request to download the application to the server apparatus 120.

In step S305, in response to receiving the download request from the terminal device 150, the application providing unit 122 of the server apparatus 120 downloads the application stored in the application storage unit 132 to the terminal device 150.

In step S306, the terminal device 150 installs the downloaded application.

(2) Flow of Process in the Construction Phase

Next, a flow of a process performed by the by the task support system 100 in the construction phase will be described. FIG. 4 is a sequence diagram illustrating a flow of a process performed by the by the task support system in the construction phase will be described.

As illustrated in FIG. 4, in step S401, the business operator 181 generates a construction photograph ledger template, and the information input apparatus 110 transmits the construction photograph ledger template generated by the business operator 181 to the server apparatus 120.

In step S402, the rule acquiring unit 124 of the server apparatus 120 acquires the construction photograph ledger template transmitted from the information input apparatus 110.

In step S403, the business operator 181 determines description rules, and the information input apparatus 110 transmits the description rules determined by the business operator 181 to the server apparatus 120.

In step S404, the rule acquiring unit 124 of the server apparatus 120 acquires the description rules transmitted from the information input apparatus 110.

In step S405, the rule acquiring unit 124 of the server apparatus 120 retrieves the attribute information stored in the attribute information storage unit 133, and sets description items defined in the acquired description rules for the construction photograph ledger template so as to generate pre-insertion information.

In step S406, the constructor 182 starts the application installed in the terminal device 150, and performs a login operation to log into the server apparatus 120. The terminal device 150 transmits a password input by the constructor 182 at the time of the login operation to the server apparatus 120.

In step S407, the server apparatus 120 performs an authentication process based on the password transmitted from the terminal device 150. If the server apparatus 120 determines that the authentication is successful, the process proceeds to step S408.

In step S408, the attribute information providing unit 123 of the server apparatus 120 performs an attribute information providing process. Specifically, the attribute information providing unit 123 of the server apparatus 120 provides the attribute information stored in the attribute information storage unit 133 to the terminal device 150.

In the present embodiment, the attribute information includes "case information", "construction details", and "photographing timing information". The "construction details" are divided into "location and device information", classified based on locations and devices, and "process and task information", classified based on processes and tasks, and the "location and device information" and "process and task information" are stored in the attribute information storage unit 133.

In step S408, the attribute information providing unit 123 of the server apparatus 120 provides the "case information", the "location and device information", the "process and task information", and the "photographing timing information" to the terminal device 150 as the attribute information.

In step S409, the terminal device 150 acquires the attribute information via the application.

Specifically, the terminal device 150 displays the "case information" transmitted from the server apparatus 120, and receives a selection of a case from the constructor 182.

Further, the terminal device 150 displays the "location and device information" transmitted from the server apparatus 120, and receives a selection of a location and device from the constructor 182.

Further, the terminal device 150 displays the "process and task information" transmitted from the server apparatus 120, and receives a selection of a process and a task from the constructor 182.

Further, the terminal device 150 displays the "photographing timing information" transmitted from the server apparatus 120, and receives a selection of a photographing timing from the constructor 182.

In step S410, the constructor 182 starts an imaging device 528 of the terminal device 150 via the application, and takes a construction photograph at a construction site. When the constructor 182 takes a construction photograph at a construction site, the constructor 182 may input "additional information" into the terminal device 150 as necessary.

The additional information includes, for example, information for identifying a constructor, information for identifying a photographer, evaluation on captured image data, information for identifying a photographing date and time (hereinafter simply referred to as a "photographing date"), and information relating to a construction observer. Note that the additional information may include location and device information and process and task information. That is, the constructor 182 may select and input a location and a device from the "location and device information" transmitted from the server apparatus 120, and a process and a task from the "process and task information" transmitted from the server apparatus 120. Alternatively, the constructor 182 may directly input a location, a device, a process, and a task as additional information.

When the constructor 182 finished taking the photograph, the terminal device 150 transmits captured image data, generated by taking the photograph, to the server apparatus 120 via the application. As described above, as attribute information, the following information is recorded in the header section of the captured image data transmitted from the terminal device 150:

the selection results (the case, the location and device, the process and task, and the photographing timing) selected by the constructor 182 when the attribute information is acquired; and the additional information (the information for identifying the constructor, the information for identifying the photographer, the evaluation on the captured image data, the photographing date, and information relating to the construction observer) input by the constructor 182 when the construction photograph is taken.

In step S411, the construction photograph acquiring unit 125 of the server apparatus 120 stores, as the construction photograph, the captured image data transmitted from the terminal device 150 in the construction photograph storage unit 135.

In step S412, the business operator 181 determines insertion rules, and the information input apparatus 110 transmits the insertion rules determined by the business operator 181 to the server apparatus 120.

In step S413, the rule acquiring unit 124 of the server apparatus 120 acquires the insertion rules transmitted from the information input apparatus 110.

Figure 15:
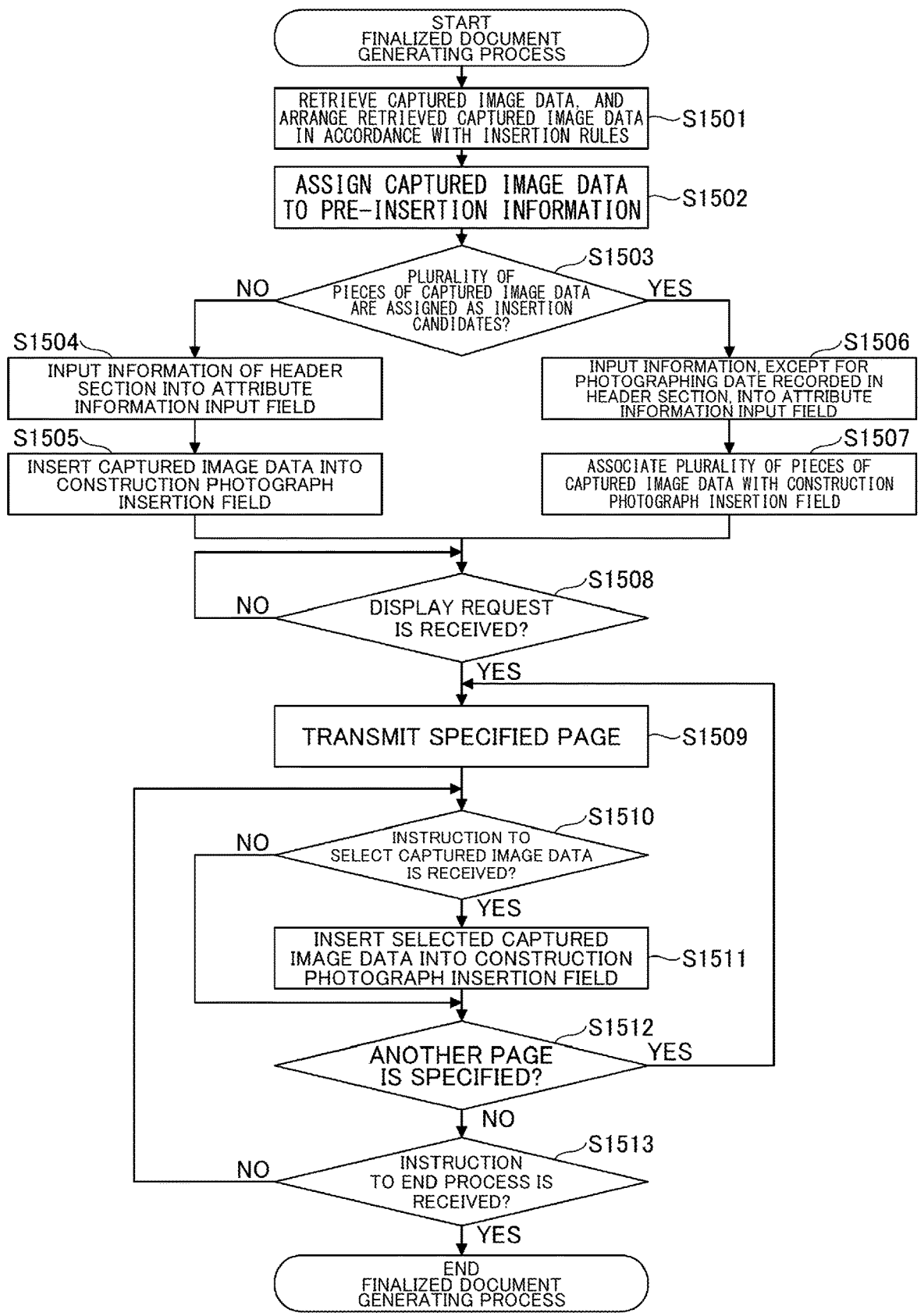
FIG. 15 is a flowchart illustrating a flow of a finalized document generating process.

In step S414, the finalized document generating unit 126 of the server apparatus 120 performs a finalized document generating process (in the present embodiment, a process for generating construction photograph ledger data) (which will be described later in detail with reference to FIG. 15).

Specifically, the finalized document generating unit 126 of the server apparatus 120 arranges pieces of captured image data, stored in step S411, in accordance with the insertion rules while referring to attribute information (selection results and additional information) recorded in the header sections of the pieces of captured image data. Further, the finalized document generating unit 126 of the server apparatus 120 sequentially inserts the pieces of the captured image data, arranged in accordance with the insertion rules, into the pre-insertion information generated in step S405. Accordingly, the insertion process can be accelerated by arranging and inserting the captured image data in accordance with the insertion rules.

Note that pre-insertion information into which captured image data is inserted is displayed on the information input apparatus 110, in response to a request from the business operator 181. At this time, if a plurality of pieces of captured image data are associated with the same attribute information, one captured image data is selected by the business operator 181. Accordingly, construction photograph ledger data, into which one appropriate captured image data selected on a per attribute information basis is inserted, is generated and stored in the finalized document storage unit 136.

Specifically, in step S415, the information input apparatus 110 receives pages of the pre-insertion information into which the captured image data is inserted from the server apparatus 120 and displays the pages of the pre-insertion information. If a plurality of pieces of captured image data are associated with the same attribute information on each of the displayed pages, the business operator 181 selects one captured image data. Further, the information input apparatus 110 transmits the selection of the one captured image data by the business operator 181 to the server apparatus 120. Accordingly, the finalized document generating unit 126 generates construction photograph ledger data into which one captured image data selected on a per attribute information basis is inserted.

In step S416, the information output apparatus 140 sends a request to download finalized document data to the server apparatus 120 in response to an instruction from the customer 180. The finalized document generating unit 126 downloads the finalized document data to the information output apparatus 140. The information output apparatus 140 acquires and displays the finalized document data downloaded by the server apparatus 120.

<Hardware Configurations of Server Apparatus and Terminal Device>

Figure 5:
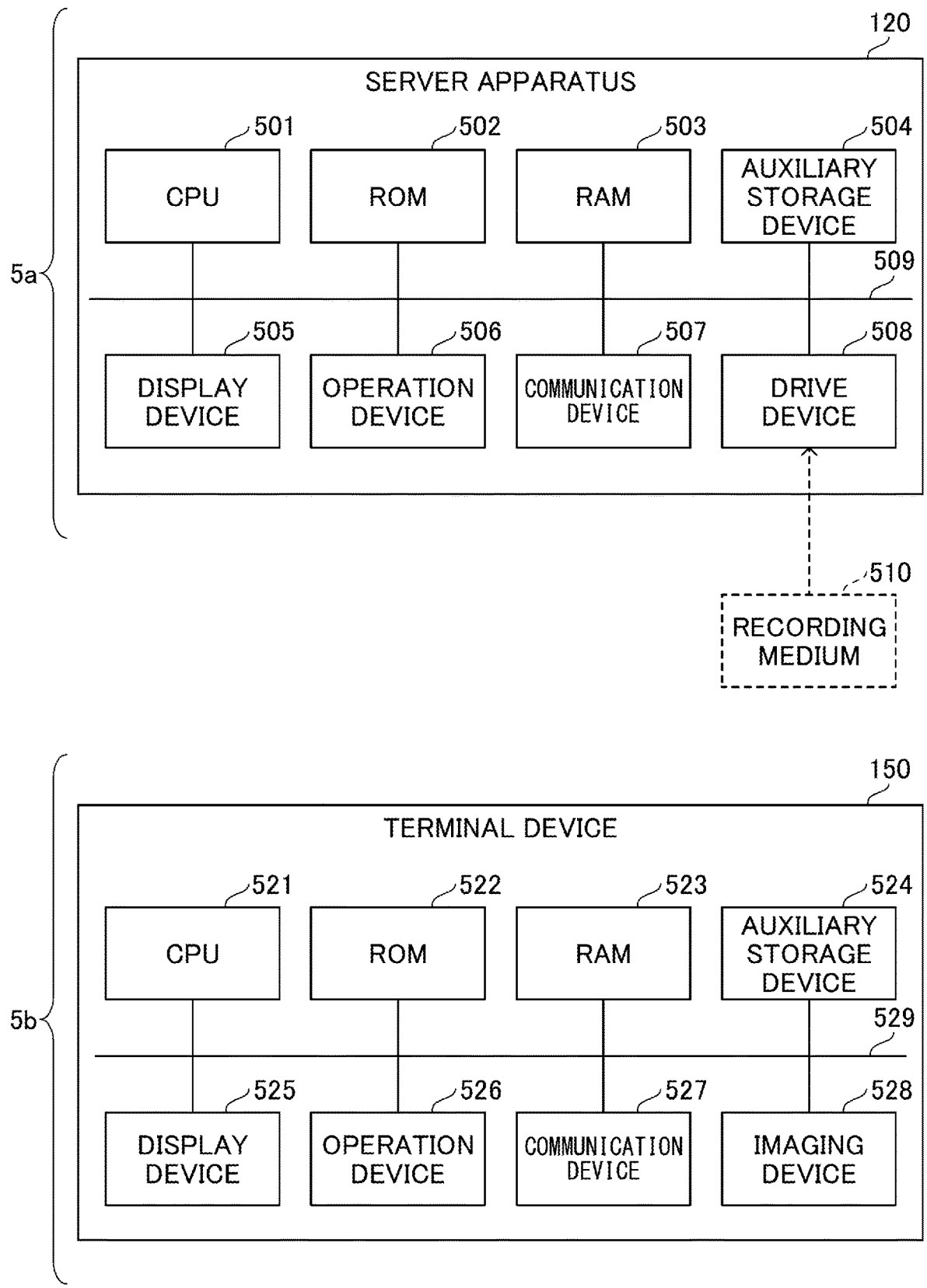
FIG. 5 is a diagram illustrating an example of a hardware configuration of each of a server apparatus and a terminal device.

Next, a hardware configuration of each of the server apparatus 120 and the terminal device 150 will be described. FIG. 5 is a diagram illustrating an example of a hardware configuration of each of the server apparatus and the terminal device.

(1) Hardware Configuration of the Server Apparatus

As illustrated in 5a of FIG. 5, the server apparatus 120 includes a central processing unit (CPU) 501, a read-only memory (ROM) 502, and a random-access memory (RAM) 503. The CPU 501, the ROM 502 and the RAM 503 form what is referred to as a computer.

Further, the server apparatus 120 includes an auxiliary storage device 504, a display device 505, an operation device 506, a communication device 507, and a drive device 508. The hardware elements of the server apparatus 120 are connected to each other via a bus 509.

The CPU 501 is a calculation device that executes various programs (for example, the task support program and the like) installed in the auxiliary storage device 504.

The ROM 502 is a non-volatile memory. The ROM 502 functions as a main storage device that stores various programs, data, and the like necessary for the CPU 501 to execute various programs installed in the auxiliary storage device 504. Specifically, the ROM 502 functions as a main storage device that stores a boot program or the like, such as a basic input/output system (BIOS) or an extensible firmware interface (EFI).

The RAM 503 is a volatile memory such as a dynamic random-access memory (DRAM) or a static random-access memory (SRAM). The RAM 503 functions as a main storage device that provides a work area in which various programs installed in the auxiliary storage device 504 are loaded when executed by the CPU 501.

The auxiliary storage device 504 is an auxiliary storage device that stores various programs and information used when the various programs are executed. The constructor information storage unit 131, the application storage unit 132, the attribute information storage unit 133, the pre-insertion information storage unit 134, the construction photograph storage unit 135, and the finalized document storage unit 136 are implemented by the auxiliary storage device 504.

The display device 505 is a display device that displays an internal state of the server apparatus 120. The operation device 506 is an input device used when an administrator (not illustrated) of the server apparatus 120 inputs various instructions into the server apparatus 120.

The communication device 507 is a communication device that is connected to a network 160 and communicates with the information input apparatus 110, the information output apparatus 140, the terminal device 150, and the like.

The drive device 508 is a device for setting a recording medium 510. The recording medium 510 includes a medium for optically, electrically, or magnetically recording information, such as a CD-ROM, a flexible disk, or a magneto-optical disc. Further, the recording medium 510 may include a semiconductor memory or the like that electrically records information, such as a ROM, a flash memory, or the like.

Various programs to be installed in the auxiliary storage device 504 are installed by, for example, setting the distributed recording medium 510 in the drive device 508 and reading the various programs recorded in the recording medium 510 by the drive device 508. Alternatively, various programs to be installed in the auxiliary storage device 504 may be installed by being downloaded from the network 160 via the communication device 507.

(2) Hardware Configuration of the Terminal Device

As illustrated in 5b of FIG. 5, the terminal device 150 has a hardware configuration (a CPU 521 to a communication device 527) similar to that of the server apparatus 120. Therefore, the difference from the server apparatus 120 will be described here.

The difference from the server apparatus 120 is that the terminal device 150 includes an imaging device 528 that functions as an imaging unit. The imaging device 528 is operated based on an operation performed by the constructor 182 and generates captured image data.

<Specific Examples of Various Kinds of Information Stored in Server Apparatus>

Next, specific examples of various kinds of information (constructor information, application information, and attribute information) stored in the server apparatus 120 will be described.

(1) Specific Examples of Constructor Information and Application Information

First, constructor information stored in the constructor information storage unit 131 of the server apparatus 120 and application information stored in the application storage unit 132 of the server apparatus 120 will be described.

FIG. 6 is a diagram illustrating examples of constructor information and application information. In FIG. 6, 6a indicates an example of constructor information 610. As illustrated in 6a of FIG. 6, the constructor information 610 stores information relating to all constructors under contract with the business operator 181 to construct air conditioning systems.

Specifically, the constructor information 610 includes "constructor ID", "constructor name", "address", "contact", "construction supervisor", "user ID", and "password" as information items.

In "constructor ID", an identifier for identifying a constructor under contract with the business operator 181 to construct an air conditioning system is stored. In "constructor name", the name of the constructor is stored. In "address", the address of the constructor is stored, and in "contact", the contact information of the constructor is stored. In "construction supervisor", the name of a construction supervisor of the constructor is stored. In "user ID" and "password", a user ID and a password used by the constructor to access the server apparatus 120 via a corresponding terminal device (for example, used by the constructor 182 to access the server apparatus 120 via the terminal device 150) are stored.

Further, 6b of FIG. 6 indicates an example of application information 620. As illustrated in 6b of FIG. 6, the application information 620 stores information relating to applications used on terminal devices carried by the constructors, under contract with the business operator 181 to construct the air conditioning systems, at the construction site.

Specifically, the application information 620 includes "app ID", "app name", "type", "version", "updated date and time", and "storage URL" as information items.

In "app ID", an identifier for identifying an application is stored. In "app name", the name of the application is stored. In "type", "version", and "updated date and time", the type, the version, and the updated date and time of the application are stored, respectively. In "storage URL", an URL that stores the application is stored.

(2) Specific Example of Attribute Information

Next, attribute information stored in the attribute information storage unit 133 of the server apparatus 120 will be described. As described above, the attribute information include case information, construction details, and photographing timing information. The construction details are divided into "location and device information" and "process and task information", and the "location and device information" and the "process and task information" are stored. Therefore, in the following, the case information, the location and device information, the process and task information, and the photographing timing information will be described.

FIG. 7 is a diagram illustrating examples of case information, location and device information, process and task information, and photographing timing information. In FIG. 7, 7a illustrates an example of case information 710. As illustrated in 7a of FIG. 7, the case information 710 stores information relating to construction cases of air conditioning systems to be constructed by the business operator 181 as requested by various customers.

Specifically, the case information 710 includes "property name", "case ID", "case name", "requester", "responsible person", "detailed information", and "contractor" as information items.

In "property name", the name of a property (for example, the name of a building) in which an air conditioning system is constructed is stored. In "case ID", an identifier for identifying a construction case is stored. In "case name", the name of the construction case is stored.

In "requester", information relating to a customer who requested the construction case is stored. In "responsible person", the name of a responsible person responsible determined by the business operator 181 for the construction case is stored. In "detailed information", detailed information of the construction case is stored. In "contractor", the constructor ID of a constructor under contract with the business operator 181 for the construction case is stored.

Further, 7b-1 of FIG. 7 illustrates an example of location and device information 720. The location and device information 720 is recorded for each construction case. In 7b-1 of FIG. 7, location and device information of a construction case having a case name of "AAA" is depicted.

As illustrated in 7b-1 of FIG. 7, the location and device information 720 includes "location and device group", "floor", "room/zone", "location", "system", and "device" as information items.

In "location and device group", an identifier for identifying each location and device group of the location and device information is stored. In "floor", the name and the floor level of a building in which construction is performed is stored. In "room/zone", the name of a room or a zone in which the construction is performed is stored. In "location", information indicating a location where a device is installed is stored.

In "system", information indicating a refrigerant system to which the device is connected is stored. In "device", the model name of the device is stored.

For example, in the location and device information 720, a location and device group of "1" indicates that a device having a model name of "FFF001DD" is installed in the attic of a "1st grade, class 1" classroom on the first floor of a north building, and is connected to a system A.

Similarly, a location and device group of "2" indicates that a device having a model name of "FFF001DD" is installed in the attic of a "1st grade, class 2" classroom on the first floor of the north building, and is connected to the system A.

Further, 7b-2 of FIG. 7 illustrates an example of process and task information 730. Similar to the location and device information 720, the process and task information 730 is recorded for each construction case. Specifically, in 7b-2 of FIG. 7, process and task information of the construction case having the case name of "AAA" is depicted.

As illustrated in 7b-2 of FIG. 7, the process and task information 730 includes "process and task group", "process", and "task" as information items.

In "process and task group", an identifier for identifying each process and task group of the process and task information is stored.

In "process", either "construction work" or "test" is stored. In "task", details of a task to be performed are stored.

For example, in the process and task information 730, a process and task group of "1" indicates construction work for installing an indoor unit. A process and task group of "2" indicates a water flow passing test. A process and task group of "3" indicates construction work for laying refrigerant pipes.

Further, 7c of FIG. 7 illustrates an example of photographing timing information 740. As illustrated in 7c of FIG. 7, the photographing timing information 740 includes "before operation", "during operation", and "after operation".

<Specific Example of Process for Generating Construction Photograph Ledger Data>

Next, a specific example of a process for generating construction photograph ledger data performed by the task support system 100 (steps S402 to S405, steps S409 and S410, and steps S412 to S414) in the sequence diagram of FIG. 4 will be described.

(1) Specific Example of a Process from Acquiring a Template to Generating Pre-Insertion Information First, a specific example of a process from step S402 (acquiring a template) to step S405 (generating pre-insertion information) in the sequence diagram of FIG. 4 will be described.

FIG. 8 is a diagram illustrating a specific example of a process from acquiring a template to generating pre-insertion information. In FIG. 8, a template 800 is a construction photograph ledger template, and includes a case name input field 801 in which a case name is input, a construction photograph insertion field 802 into which captured image data is inserted, and an attribute information input field 803 in which attribute information is input.

First, the rule acquiring unit 124 acquires the construction photograph ledger template 800. Next, the rule acquiring unit 124 acquires description rules from the information input apparatus 110. Next, the rule acquiring unit 124 refers to the case information 710 stored in the attribute information storage unit 133, and sets a case name, corresponding to a description item defined in the description rules, in the case name input field 801.

Next, the rule acquiring unit 124 refers to the location and device information 720, the process and task information 730, and the photographing timing information 740 stored in the attribute information storage unit 133, and sets, in the attribute information input field 803, description items defined in the description rules. Further, the rule acquiring unit 124 sets, in the attribute information input field 803, description items that are defined in the description rules and are not included in the location and device information 720, the process and task information 730, and the photographing timing information 740.

Accordingly, the rule acquiring unit 124 generates pre-insertion information 810, and stores the pre-insertion information 810 in the pre-insertion information storage unit 134.

In the example of FIG. 8, the case name of "AAA" is set in the case name input field 801 based on the case information 710. Further, in the example of FIG. 8, from among items included in the location and device information 720, the process and task information 730, and the photographing timing information 740, description items (floor, room/zone, device, task, and photographing timing) defined in the description rules are set. Further, in the example of FIG. 8, a description item (photographing date) that is defined in the description rules and is not included in the location and device information 720, the process and task information 730, and the photographing timing information 740 is set.

Accordingly, items to be input in the attribute information input field 803 can be set in accordance with the description rules. Thus, the workload of the business operator 181 in generating construction photograph ledger data can be reduced.

Figure 9:
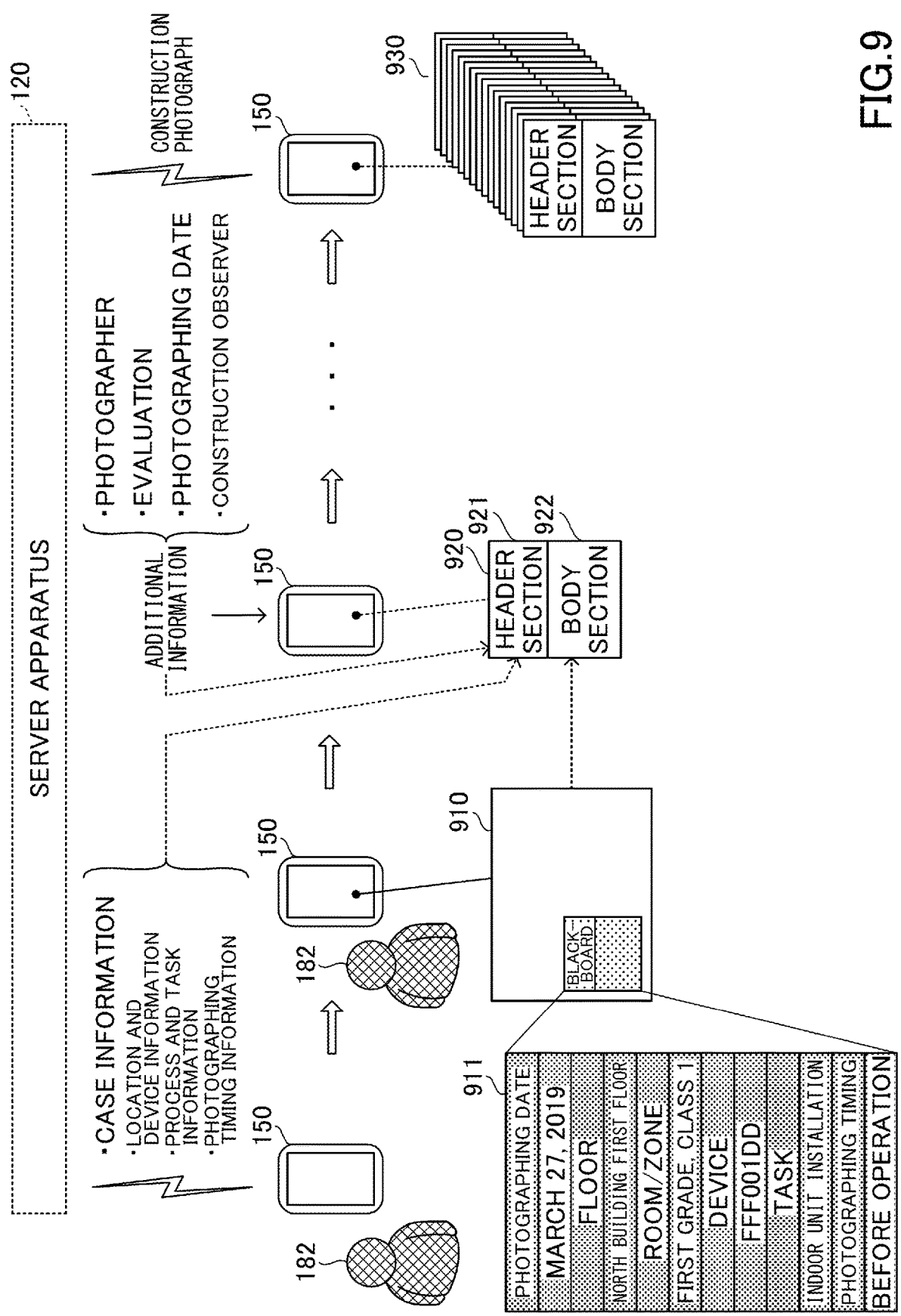
FIG. 9 is a diagram illustrating a specific example of a process from acquiring attribute information to taking a photograph.

(2) Specific Example of a Process from Acquiring Attribute Information to Taking a Photograph Next, a specific example of a process from step S409 (acquiring attribute information) to step S410 (taking a photograph) in the sequence diagram of FIG. 4 will be described. FIG. 9 is a diagram illustrating a specific example of a process from acquiring attribute information to taking a photograph.

If it is determined that authentication is successful in response to the constructor 182 starting an application on the terminal device 150 and logging into the server apparatus 120 (step S406 of FIG. 4), the terminal device 150 acquires attribute information as illustrated in FIG. 9.

Specifically, the server apparatus 120 transmits case information (for example, the case information 710) to the terminal device 150. The terminal device 150 displays the received case information in a list. At this time, the constructor 182 selects a case from the case information displayed in the list.

Next, the server apparatus 120 transmits location and device information (for example, location and device information 720) and process and task information (for example, process and task information 730), which are associated with the selected case, to the terminal device 150. The terminal device 150 displays the location and device information and the process and task information in a list. At this time, the constructor 182 selects a location, a device, a process, and a task, for the construction by the constructor 182, from the location and device information and the process and task information in the list.

Next, the server apparatus 120 transmits photographing timing information (for example, photographing timing information 740) to the terminal device 150. The terminal device 150 displays the photographing timing information in a list. At this time, the constructor 182 selects a photographing timing from the photographing timing information displayed in the list.

Selection results selected by the constructor 182 are reflected on blackboard information 911 of the terminal device 150. The blackboard information 911 is displayed on a screen of the terminal device 150 when the constructor 182 takes a construction photograph at a construction site (see image data 910).

The constructor 182 takes a construction photograph with the blackboard information 911 being displayed. Thus, the terminal device 150 can generate captured image data 920 in which the image data 910 is recorded in a body section 922. The blackboard information 911 is superimposed on the image data 910. The selection results selected by the constructor 182 are recorded in a header section 921 of the captured image data 920.

Accordingly, the workload of the constructor 182 in taking construction photographs can be reduced by providing attribute information to the terminal device 150 and allowing the constructor 182 to select information (that is, by saving time to input attribute information).

When the constructor 182 finished taking the photograph, the constructor 182 inputs additional information. As described above, the additional information includes information for identifying a constructor, information for identifying a photographer, evaluation on captured image data, information for identifying photographing date and time, and information relating to a construction observer. Note that the evaluation on captured image data may be a simple evaluation as to whether the captured image data is "OK" or "NG", or may be a detailed evaluation.

For example, the detailed evaluation includes:
determining whether the captured image data is appropriately captured (determining whether the image quality is not degraded due to camera shake or the like);
determining whether the captured image data is suitable to be inserted into construction photograph ledger data (determining whether the captured image data meets requirements for insertion into construction photograph ledger data, and whether the photographing location is appropriate); and
determining the use of the captured image data (determining whether the captured image data is inserted into construction photograph ledger data or is not inserted into construction photograph ledger data but is retained without being deleted), and the like.

As illustrated in FIG. 9, when the additional information is input by the constructor 182, the terminal 150 records the input additional information in the header section 921 of the captured image data 920. Therefore, attribute information (the selection results and the additional information) is recorded in the header section 921 of the captured image data 920.

As illustrated in FIG. 9, the constructor 182 repeats the same process each time the constructor 182 takes a photograph at the construction site. Accordingly, when taking all photographs are completed, a plurality of pieces of captured image data 930 are stored in the terminal device 150.

The terminal device 150 transmits the plurality of pieces of captured image data 930 to the server apparatus 120. Note that the terminal device 150 may transmit captured image data to the server apparatus 120 after taking all photographs is completed as illustrated in FIG. 9 or immediately after each photograph is taken.

(3) Specific Example of a Process for Determining Insertion Rules

Next, a specific example of step S412 (determining insertion rules) in the sequence diagram of FIG. 4 will be described.

(3-1) First Specific Example

Figure 10:
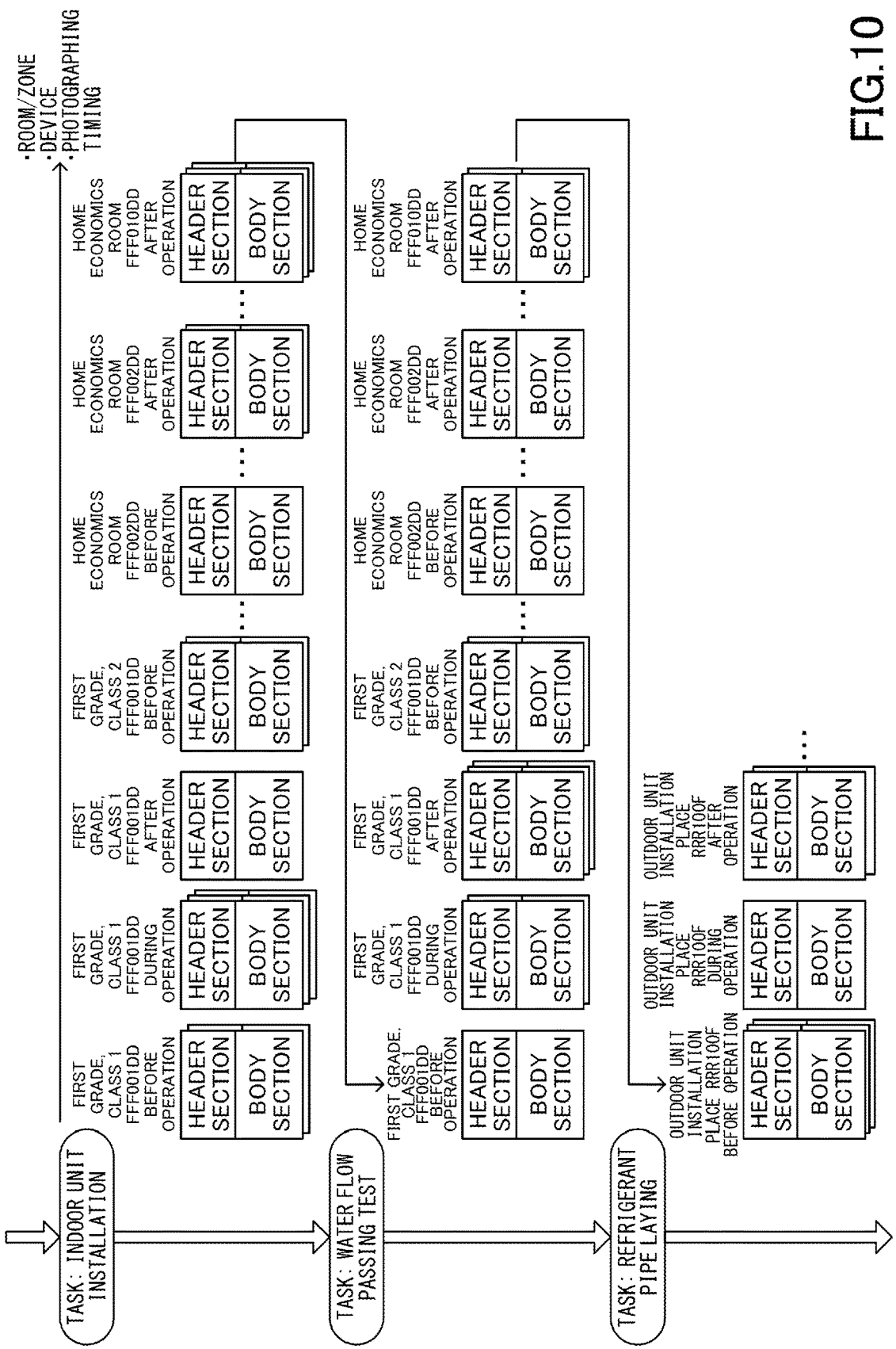
FIG. 10 is a first diagram illustrating an example of arrangement based on insertion rules.

FIG. 10 is a first diagram illustrating an example of arrangement based on insertion rules. In the example illustrated in FIG. 10, a plurality of pieces of captured image data are arranged in accordance with insertion rules that define the following:
the plurality of pieces of captured image data are classified into groups on a per task basis, and are arranged in the order of a "task: indoor unit installation" group, a "task: water flow passing test" group, and a "task: refrigerant pipe laying" group; and
the plurality of pieces of captured image data, classified into the groups, are further classified on a per room/zone basis and on a per device basis, and captured image data of the same room/zone and captured image data of the same device are preferentially arranged and then arranged in the order of photographing timings.

In FIG. 10, a plurality of pieces of captured image data that are superimposed indicate that the plurality of pieces of captured image data are associated with the same attribute information. For example, in the case of "task=indoor unit installation", "room/zone=1st grade, class 1", "device="FFF001DD", and "photographing timing=before operation", it can be seen that two pieces of captured image data having the same attribute information (to be input into the attribute information input field 803) are associated with each other.

(3-2) Second Specific Example

Figure 11:
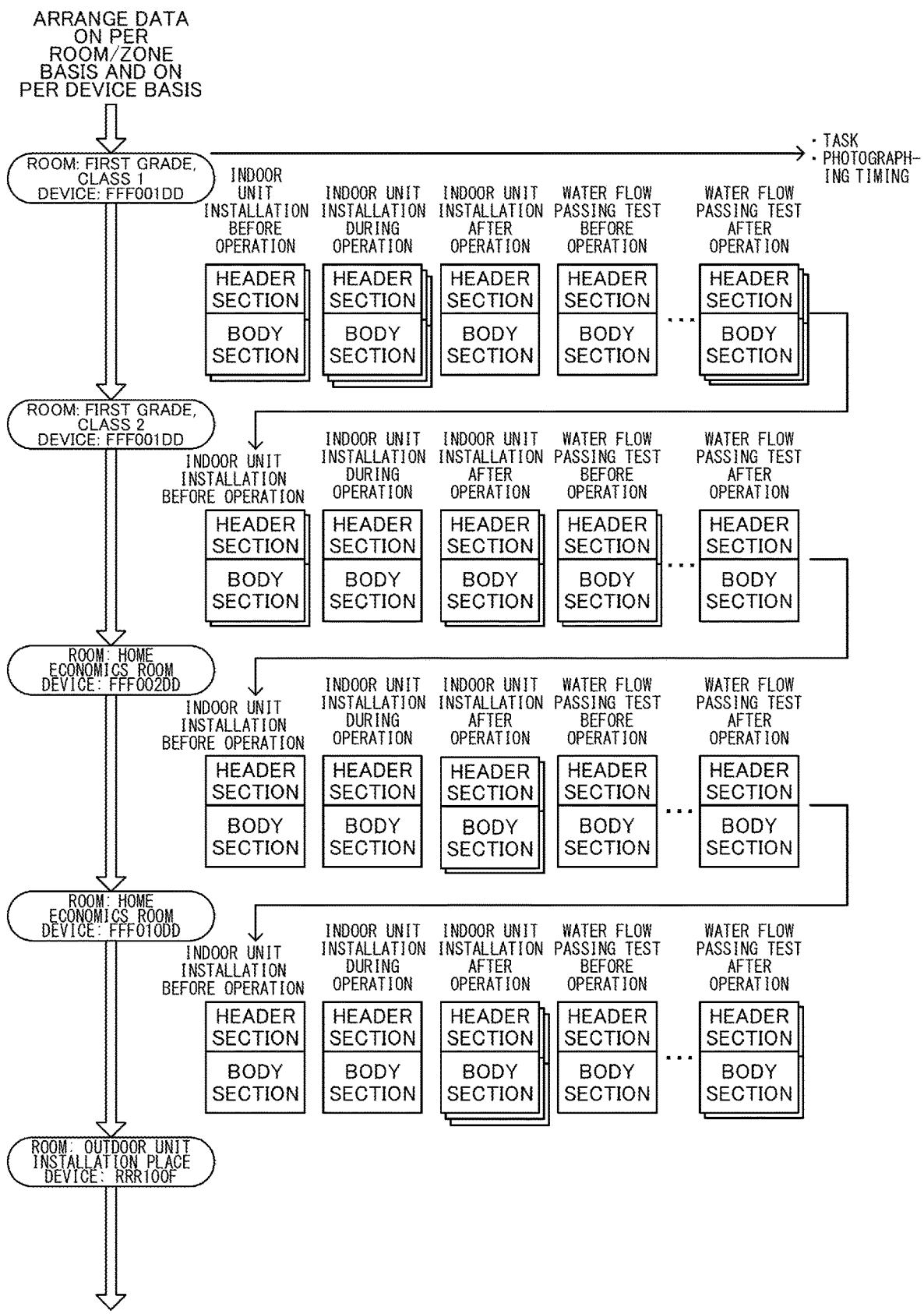
FIG. 11 is a second diagram illustrating an example of arrangement based on insertion rules.

FIG. 11 is a second diagram illustrating an example of arrangement based on insertion rules. In the example illustrated in FIG. 11, a plurality of pieces of captured image data are arranged in accordance with insertion rules that define the following:
the plurality of pieces of captured image data are classified into groups on a per room/zone basis and on a per device basis, and are arranged such that "room/zone, device" is in the order of "first grade, class 1, FFF001DD", "first grade, class 2, FFF001DD", and so on;
the plurality of pieces of captured image data, classified into the groups, are further classified on a per task basis, and captured image data of the same task is preferentially arranged and then arranged in the order of photographing timings.

Figure 12:
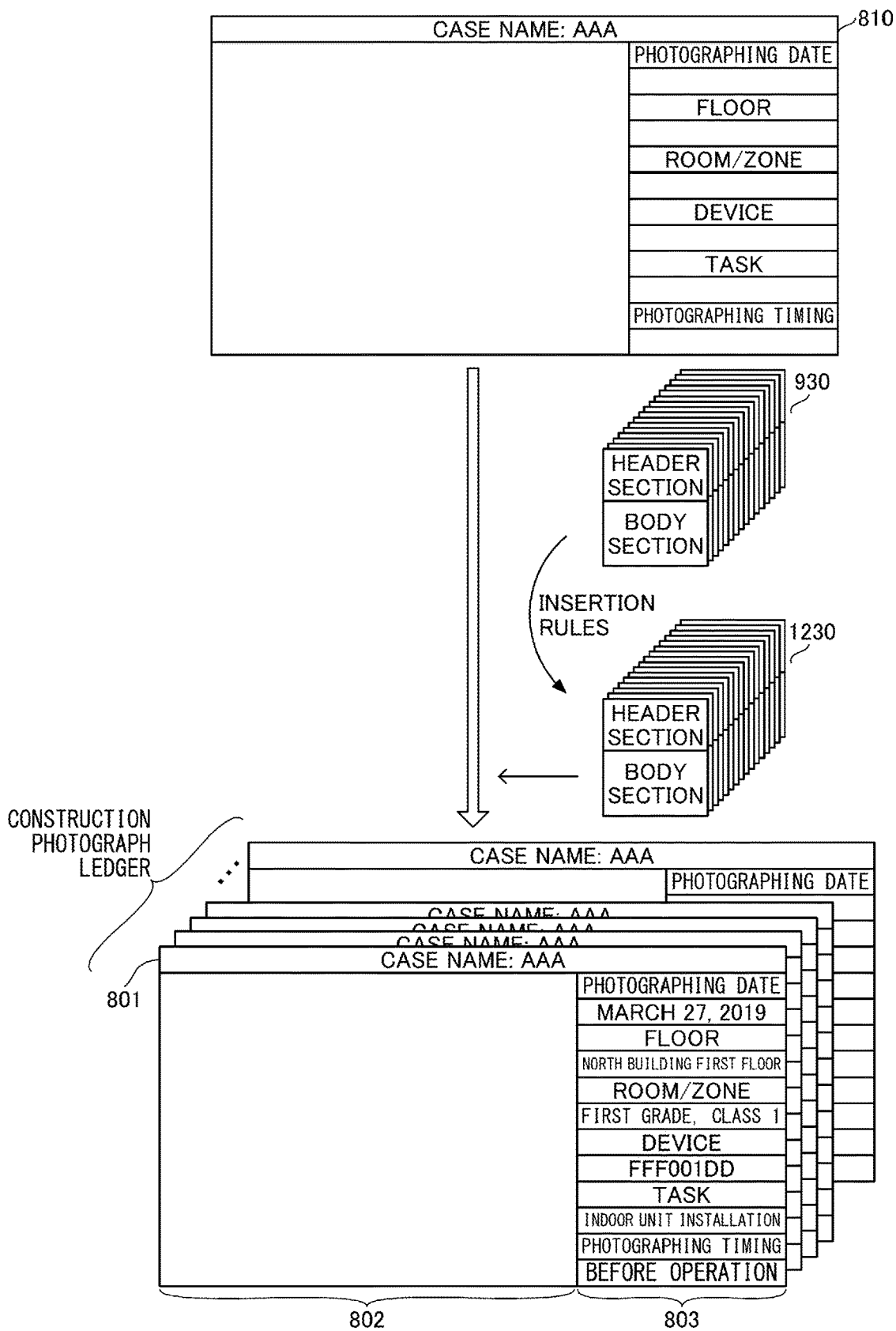
FIG. 12 is a diagram illustrating a specific example of a process from acquiring insertion rules to generating a finalized document.

(4) Specific Example of a Process from Acquiring Insertion Rules to Generating a Finalized Document Next, a specific example of a process from step S413 (acquiring insertion rules) to step S414 (generating a finalized document) in the sequence diagram of FIG. 4 will be described. FIG. 12 is a diagram illustrating a process from acquiring insertion rules to generating a finalized document.

In response to the rule acquiring unit 124 acquiring insertion rules from the information input apparatus 110, the finalized document generating unit 126 retrieves the pre-insertion information 810 from the insertion information storage unit 134. Further, the finalized document generating unit 126 retrieves the plurality of pieces of captured image data 930 from the construction photograph storage unit 135.

Next, the finalized document generating unit 126 arranges the retrieved plurality of pieces of captured image data 930 in accordance with the acquired insertion rules while referring to attribute information (selection results, in this example) recorded in header sections of the plurality of pieces of captured image data 930. Captured image data 1230 is captured image data that has been arranged in accordance with the insertion rules.

Next, the finalized document generating unit 126 sequentially inserts the captured image data 1230, arranged in accordance with the insertion rules, into the pre-insertion information 810 so as to generate construction photograph ledger data. Specifically, the finalized document generating unit 126 inserts a body section of each piece of the captured image data 1230 into a construction photograph insertion field 802, and inputs attribute information (selection results and additional information) recorded in a header section of each piece of the captured image data 1230 into an attribute information input field 803. In this manner, the finalized document generating unit 126 can generate construction photograph ledger data.

Accordingly, the workload of the business operator 181 in generating construction photograph ledger data can be reduced by automatically arranging a plurality of pieces of captured image data in accordance with insertion rules while referring to attribute information recorded in header sections.

Note that if there are a plurality of pieces of captured image data whose attribute information (in this example, selection results) recorded in header sections is the same, the finalized document generating unit 126 associates the plurality of pieces of captured image data with a construction photograph insertion field 802 and retains the plurality of pieces of captured image data associated with the construction photograph insertion field 802. In other words, if a plurality of pieces of captured image data are associated with the same attribute information, the finalized document generating unit 126 associates the plurality of pieces of captured image data with a construction photograph insertion field 802 and retains the plurality of pieces of captured image data associated with the construction photograph insertion field 802.

Note that from among pages constituting the construction photograph ledger data, if a page on which a body section of captured image data is associated with a construction photograph insertion field 802 is displayed, the body section of the captured image data is displayed in a selectable manner as a candidate to be inserted into the construction photograph insertion field 802.

<Specific Example of Display and Selection Process>

Next, a specific example of step S415 (a display and selection process) in the sequence diagram of FIG. 4 will be described. As described above, if a plurality of pieces of captured image data are associated with the same attribute information when each page of construction photograph ledger data is displayed, the information input apparatus 110 receives a selection of one captured image data.

Figure 13:
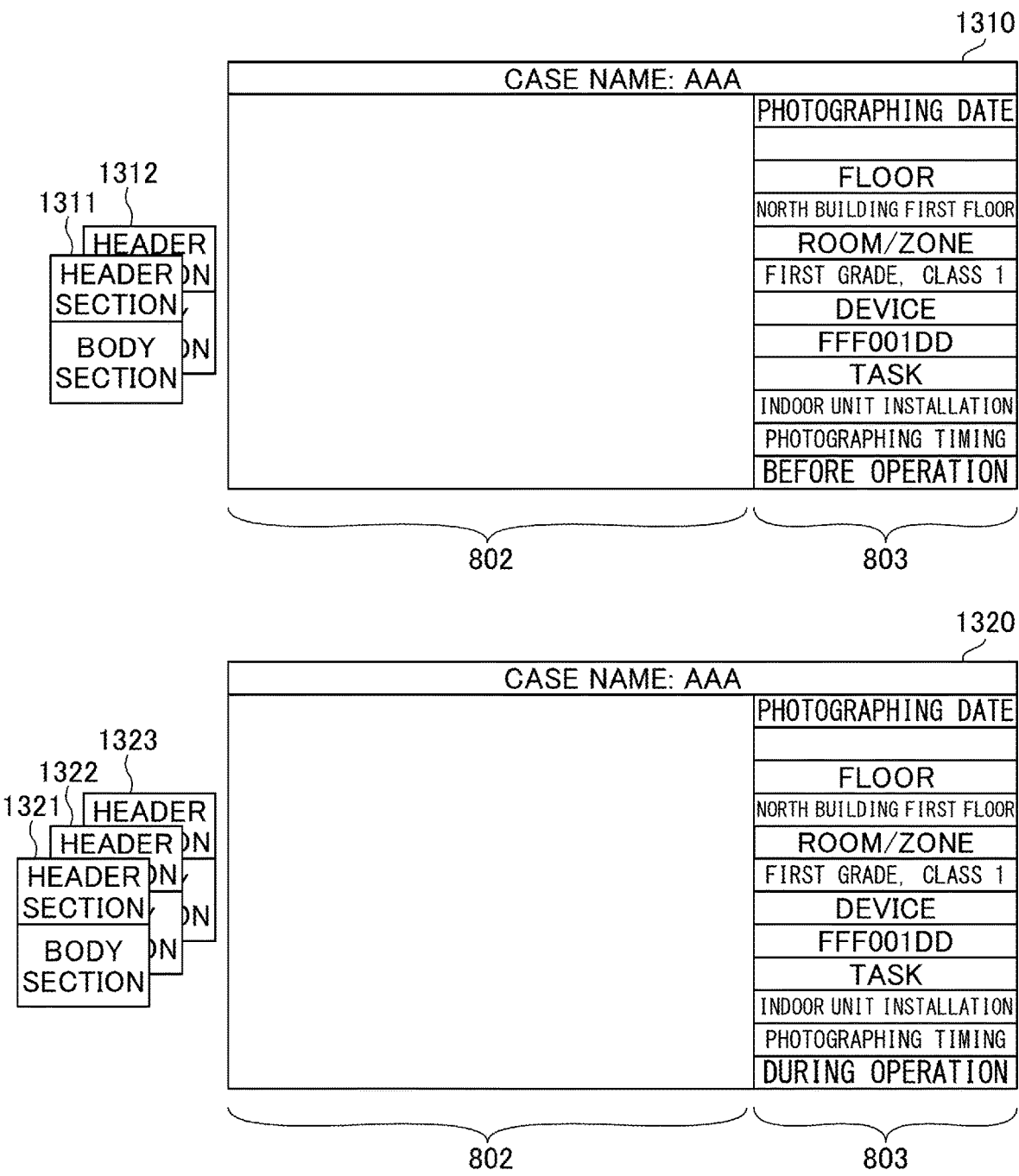
FIG. 13 is a first diagram illustrating a specific example of a display and selection process.

FIG. 13 is a first diagram illustrating a specific example of a display and selection process. In FIG. 13, the information input apparatus 110 displays a page on which a plurality of pieces of captured image data are associated with the same attribute information.

Specifically, in construction photograph ledger data 1310, captured image data 1311 and captured image data 1312 are associated with a construction photograph insertion field 802 and are retained as insertion candidates. Attribute information (selection results, in this example) recorded in header sections of the captured image data 1311 and the captured image data 1312 is as follows.

Floor=north building first floor
Room/zone=first grade, class 1
Device=FFF001DD
Task=indoor unit installation
Photographing timing=before operation Similarly, in construction photograph ledger data 1320, captured image data 1321, captured image data 1322, and captured image data 1323 are associated with a construction photograph insertion field 802 and retained. Attribute information (selection results, in this example) recorded in header sections of the captured image data 1321, the captured image data 1322, and the captured image data 1323 is as follows.

Floor=north building first floor
Room/zone=first grade, class 1
Device=FFF001DD
Task=indoor unit installation
Photographing timing=during operation When a page of the construction photograph ledger data 1310 is displayed by the information input apparatus 110, the business operator 181 selects either the captured image data 1311 or the captured image data 1312, which are insertion candidates. The information input apparatus 110 transmits a selection instruction, indicating which insertion candidate is selected, to the server apparatus 120.

Similarly, when a page of the construction photograph ledger data 1320 is displayed by the information input apparatus 110, the business operator 181 selects one of the captured image data 1321, the captured image data 1322, and the captured image data 1323, which are insertion candidates. The information input apparatus 110 transmits a selection instruction, indicating which insertion candidate is selected, to the server apparatus 120.

Figure 14:
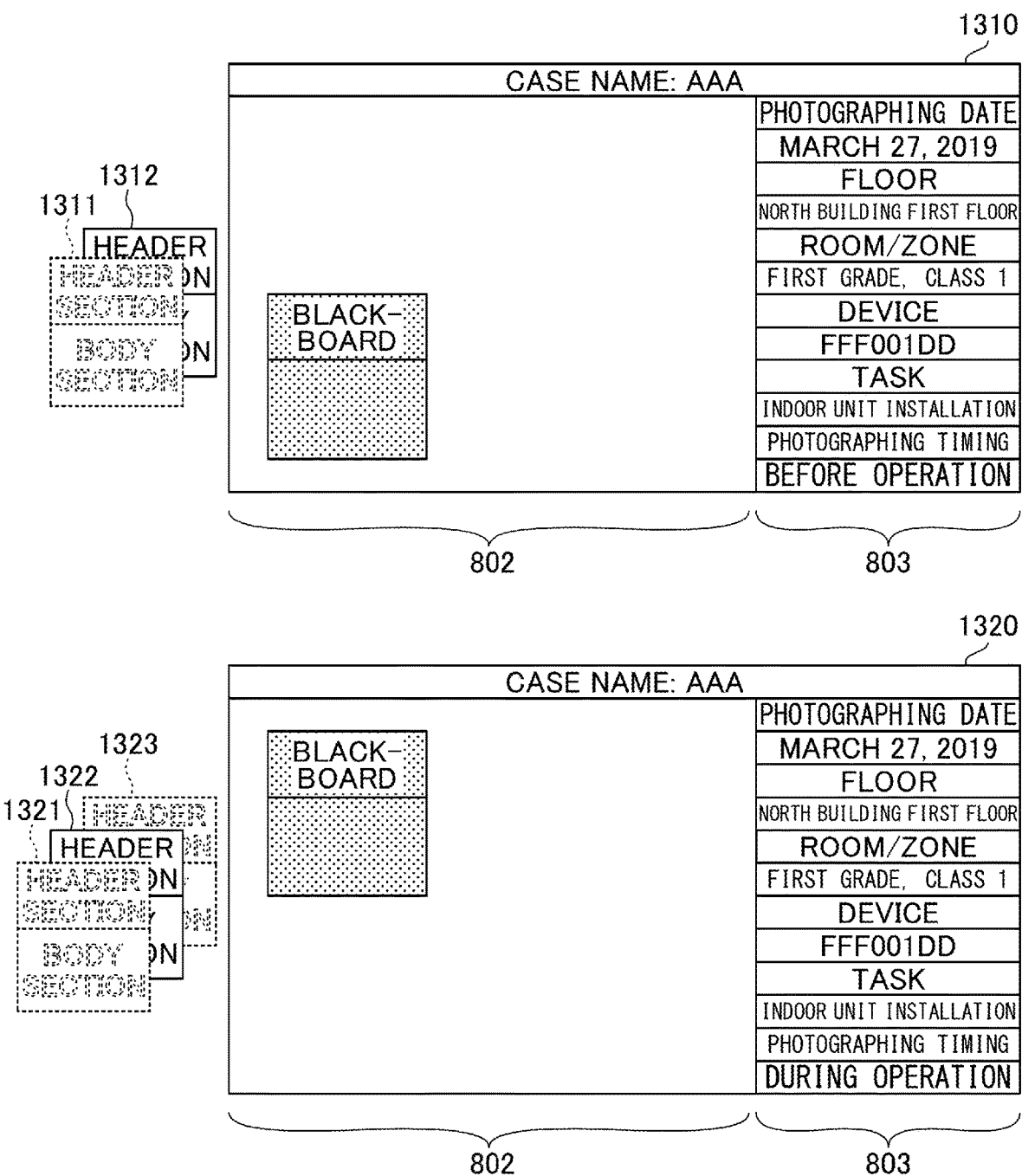
FIG. 14 is a second diagram illustrating a specific example of the display and selection process.

FIG. 14 is a second diagram illustrating a specific example of the display and selection process. In the example of FIG. 14, upon an insertion candidate being selected, the body section of the selected captured image data is inserted into the construction photograph insertion field 802, and a photographing date recorded in the header section of the selected captured image data is input into a photographing date field of the attribute information input field 803.

Specifically, the construction photograph ledger data 1310 indicates that the captured image data 1312 is selected, and the body section of the captured image data 1312 is inserted into the construction photograph insertion field 802. Further, from among additional information of attribute information recorded in the header section of the captured image data 1312, a photographing date is input into a photographing date field of the attribute information input field 803.

Further, the construction photograph ledger data 1320 indicates that the captured image data 1322 is selected, and the body section of the captured image data 1322 is inserted into the construction photograph insertion field 802. Further, from among additional information of attribute information recorded in the header section of the captured image data 1322, a photographing date is input into a photographing date field of the attribute information input field 803.

Although not illustrated in FIG. 13 and FIG. 14, when the information input apparatus 110 displays captured image data associated with a construction photograph insertion field 802 as an insertion candidate, the information input apparatus 110 may be configured to display additional information recorded in the header section of the captured image data.

Accordingly, insertion candidates are associated with a construction photograph insertion field 802 and retained. Thus, each time a page of construction photograph ledger data is displayed, the business operator 181 can visually recognize insertion candidates to be inserted into a construction photograph insertion field 802.

Therefore, as compared to when captured image data is selected from a plurality of pieces of captured image data 930 as in the conventional manner, the workload of the business operator 181 in selecting captured image data can be reduced. Further, when selecting one of a plurality of pieces captured image data, the business operator 181 can view additional information recorded in header sections. Thus, the business operator 181 can select more appropriate captured image data.

<Flow of Finalized Document Generating Process>

Next, a flow of the finalized document generating process (step S414 of FIG. 4) performed by the rule acquiring unit 124 and the finalized document generating unit 126 of the server apparatus 120 will be described. FIG. 15 is a flowchart illustrating the flow of the finalized document generating process.

In step S1501, the rule acquiring unit 124 retrieves captured image data stored in the construction photograph storage unit 135. Further, the rule acquiring unit 124 arrange the retrieved captured image data in accordance with the insertion rules while referring to attribute information recorded in the header sections of the captured image data.

In step S1502, the rule acquiring unit 124 sequentially assigns the captured image data, arranged in accordance with the insertion rules, to pre-insertion information.

In step S1503, the finalized document generating unit 126 determines whether a plurality of pieces of captured image data are assigned to one pre-insertion information. If the finalized document generating unit 126 determines that one captured image data is assigned to one pre-insertion information in step S1503 (NO in step S1503), the process proceeds to step S1504.

In step S1504, the finalized document generating unit 126 inputs attribute information, recorded in the header section of the captured image data, into an attribute information input field of the pre-insertion information.

In step S1505, the finalized document generating unit 126 inserts the body section of the captured image data into a construction photograph insertion field of the pre-insertion information.

If the finalized document generating unit 126 determines that a plurality of pieces of captured image data are assigned to one pre-insertion information in step S1503 (YES in step S1503), the process proceeds to step S1506.

In step S1506, the finalized document generating unit 126 inputs attribute information except for a photographing date, which is one of additional information from among attribute information recorded in the header sections of the pieces of captured image data, into an attribute information input field.

In step S1507, the finalized document generating unit 126 associates the plurality of pieces of captured image data with a construction photograph insertion field of the pre-insertion information.

In step S1508, the finalized document generating unit 126 determines whether a request to display construction photograph ledger data is received from the information input apparatus 110. In step S1508, if the finalized document generating unit 126 determines that a request to display construction photograph ledger data is not received (NO in step S1508), the finalized document generating unit 126 waits until determining that a request to display construction photograph ledger data is received.

Conversely, in step S1508, if the finalized document generating unit 126 determines that a request to display construction photograph ledger data is received (YES in step S1508), the process proceeds to step S1509.

In step S1509, the finalized document generating unit 126 transmits a page, specified by the information input apparatus 110, of the construction photograph ledger data to the information input apparatus 110.

In step S1510, the finalized document generating unit 126 determines whether an instruction to select captured image data is received from the information input apparatus 110.

In step S1510, if the finalized document generating unit 126 determines that an instruction to select captured image data is not received (NO in step S1510), the process proceeds to step S1512.

Conversely, in step S1510, if the finalized document generating unit 126 determines that an instruction to select captured image data is received (YES in step S1510), the process proceeds to step S1511.

In step S1511, the finalized document generating unit 126 inserts the body section of the selected captured image data into the associated construction photograph insertion field. Further, the finalized document generating unit 126 inputs a photographing date, recorded in the header section of the selected captured image data, into a photographing date field of the attribute information input field.

In step S1512, the finalized document generating unit 126 determines whether a request to display another page is received from the information input apparatus 110. If the finalized document generating unit 126 determines that a request to display another page is received in step S1512 (YES in step S1512), the process returns to step S1509.

Conversely, if the finalized document generating unit 126 determines that a request to display another page is not received in step S1512 (NO in step S1512), the process proceeds to step S1513.

In step S1513, the finalized document generating unit 126 determines whether an instruction to end the process is received from the information input apparatus 110. If the finalized document generating unit 126 determines that an instruction to end the process is not received in step S1513 (NO in step S1513), the process returns to step S1510.

Conversely, if the finalized document generating unit 126 determines that an instruction to end the process is received in step S1513 (YES in step S1513), the finalized document generating unit 126 ends the finalized document generating process.

<Summary>

As is clear from the description above, the server apparatus according to the first embodiment is configured such that:

- the construction photograph acquiring unit acquires a plurality of captured images associated with pieces of attribute information from a terminal device configured to associate the captured images with the pieces of attribute information that each includes a construction detail and a photographing timing;
- the rule acquiring unit acquires an insertion rule and/or a description rule of a document for reporting a construction status; and
- the finalized document generating unit generates image information based on the pieces of attribute information, associated with the plurality of captured images acquired by the first acquiring unit, and the insertion rule and/or the description rule acquired by the second acquiring unit.

Accordingly, in the first embodiment, the workload of the business operator in generating construction photograph ledger data can be reduced.

Second Embodiment

In the above-described first embodiment, the constructor 182 inputs additional information when taking a construction photograph. However, additional information may be stored in the attribute information storage unit 133 in advance, and when the server apparatus 120 provides other attribute information, the server apparatus 120 may also provide the additional information.

Accordingly, similar to the other attribute information, the constructor 182 can select any of the additional information displayed on the terminal device 150.

Further, in the above-described first embodiment, the two patterns are depicted in FIG. 10 and FIG. 11 as examples of arrangement based on insertion rules. However, examples of arrangement based on insertion rules are not limited to the two patterns, and any other pattern may be applied.

Further, in the above-described first embodiment, the processes performed by the task support system 100 when generating construction photograph ledger data, from among data included in the finalized document 200, have been described. However, the task support system 100 may use the processes when generating data other than the construction photograph ledger data (for example, air conditioner test operation table data, airtightness test result table data, water flow test result table data, airflow volume measurement test comparison table data, and the like).

Further, in the above-described first embodiment, the constructor 182 inputs a photographing date as one of additional information; however, the photographing date may be automatically input.

Further, in the above-described first embodiment, if a plurality of pieces of captured image data is associated with the same attribute information, the business operator 181 selects one captured image data of the plurality of pieces of captured image data. However, a method of selecting one captured image data is not limited thereto, and the last captured image data may be automatically selected. Further, if one captured image data is selected by the business operator 181, and subsequently, another captured image data having the same attribute information is added, the one captured image data, selected by the business operator 181, and the other captured image data, added after the one captured image data is selected, may be displayed as selection candidates. That is, captured image data not selected the first time may be excluded from selection candidates.

Third Embodiment

In the above-described first and second embodiments, construction photograph ledger data generated based on captured image data is used as a part of a finalized document that is delivered to a customer. However, construction photograph ledger data generated based on captured image data is not necessarily used as a part of a finalized document that is delivered to a customer. For example, construction photograph ledger data may be used as a part of a document (a document attached to a subsidy application form) that is submitted to an administrative agency when applying for a subsidy for construction.

If construction photograph ledger data is used as described above, a format for generating the construction photograph ledger data differs from that used as a part of a finalized document that is delivered to a customer. In a third embodiment, when generating construction photograph ledger data, it is desirable to select a plurality of formats in accordance with the uses from among a plurality of types of formats, and capture image data based on the selected plurality of formats.

In the third embodiment, a task support system that can generate construction photograph ledger data by selecting a plurality of formats in accordance with the uses will be described.

<System Configuration of Task Support System>

Figure 16:
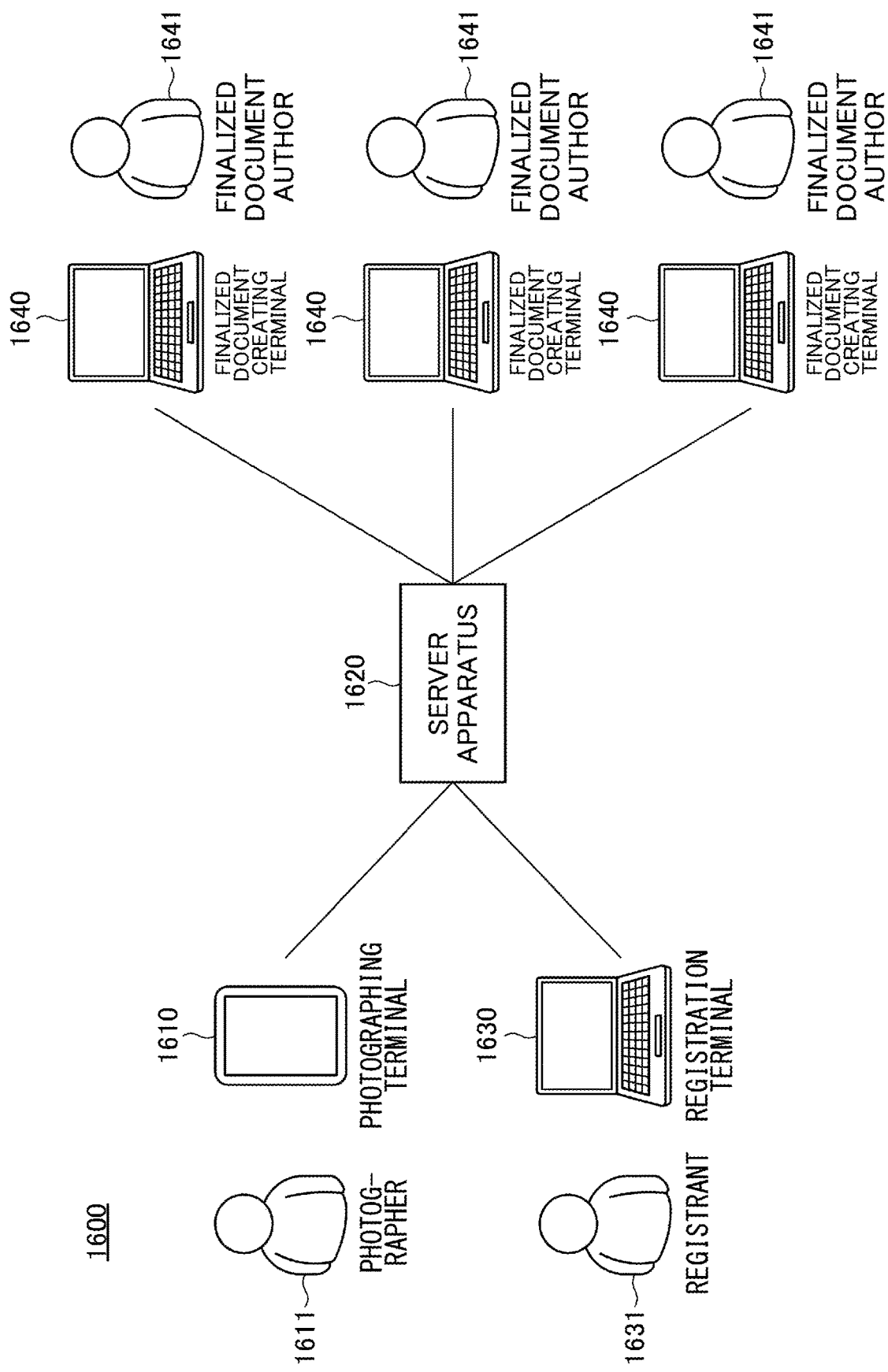
FIG. 16 is a diagram illustrating another example of a system configuration of a task support system.

First, a system configuration of a task support system according to the third embodiment will be described. FIG. 16 is a diagram illustrating another example of a system configuration of a task support system. As illustrated in FIG. 16, a task support system 1600 includes a photographing terminal 1610, a server apparatus 1620, a registration terminal 1630, and a finalized document creating terminal 1640. The server apparatus 1620 is communicably connected to the photographing terminal 1610, the registration terminal 1630, and the finalized document creating terminal 1640 via a network. In the following, the functions of each of the apparatus and the terminals will be described.

(1) Server Apparatus

The server apparatus 1620 is an example of a task support apparatus, and is configured by one or more computers. The server apparatus 1620 includes a storage unit, and the storage unit stores formats for generating construction photograph ledger data that constitutes at least a part of a finalized document. In the present embodiment, a plurality of types of formats (for example, a format for each subsidy type, a format for each customer, and the like) are stored as formats for generating construction photograph ledger data that constitutes a part of a finalized document.

The formats for generating construction photograph ledger data will be described. Each of the formats for generating construction photograph ledger data includes position information and use information of image data to be captured and inserted. The position information indicates a photographing location where image data is to be captured. For example, the position information is information indicating a photographing location (for example, "roof/ceiling", "air conditioning equipment (heat source equipment)", "air conditioning equipment+lighting equipment", or the like) where image data is to be captured. Further, each of the formats for generating construction photograph ledger data includes precautions. The precautions include, for example, precautions to be taken when capturing image data, precautions to be taken when generating construction photograph ledger data, and the like.

Further, each of the formats stored in the storage unit of the server apparatus 1620 may be construction photograph ledger data that has already been generated (i.e., a format into which captured image data has already been inserted), or may be construction photograph ledger data that is still being generated (i.e., a format into which captured image data has not yet been inserted).

The server apparatus 1620 transmits, to the photographing terminal 1610, position information and use information about image data to be captured and inserted into a plurality of formats (for example, a format for subsidy A, a format for customer B, and the like) selected from a plurality of types of formats for generating construction photograph ledger data. The functions of the server apparatus 1620 will be described later in detail with reference to FIG. 18.

(2) Photographing Terminal

The photographing terminal 1610 is a terminal for capturing image data. The photographing terminal 1610 has a camera function. The photographing terminal 1610 includes a smartphone, a tablet, and the like. The photographing terminal 1610 receives, from the server apparatus 1620, position information and use information about each of pieces of image data to be captured and inserted into a plurality of formats (for example, the format for subsidy A, the format for customer B, and the like) selected from a plurality of types of formats for generating construction photograph ledger data. The photographing terminal 1610 may display the use information received from the server apparatus 1620. In the present embodiment, a person who operates the photographing terminal 1610 is referred to as a photographer 1611. The photographing terminal 1610 will be described later in detail with reference to FIG. 17.

Use information displayed by the photographing terminal 1610 will be described. As described above, the photographing terminal 1610 may be configured to display use information about each of pieces of image data to be captured. With this configuration, as use information about each of pieces of image data to be captured, the photographing terminal 1610 displays one or more uses ("for subsidy A", "for customer B", "for both subsidy A and customer B", and the like, for example) about image data to be captured.

(3) Registration Terminal

The registration terminal 1630 is a terminal for registering position information in the server apparatus 1620 in advance (that is, before the photographer 1611 captures image data) for each type of format. The position information indicates a photographing location where image data (inserted into construction photograph ledger data) is to be captured. The registration terminal 1630 is configured by, for example, a personal computer and the like. In the present embodiment, a person who operates the registration terminal 1630 is referred to as a registrant 1631. The registration terminal 1630 will be described later in detail with reference to FIG. 19.

(4) Finalized Document Creating Terminal

The finalized document creating terminal 1640 is a terminal for generating finalized document data by inserting captured image data, captured by the photographing terminal 1610, into a format stored in the storage unit of the server apparatus 1620 and generating construction photograph ledger data. The finalized document creating terminal 1640 can display construction photograph ledger data that has already been generated and is stored in the server apparatus 1620. The finalized document creating terminal 1640 is configured by, for example, a personal computer and the like. In the present embodiment, a person who operates the finalized document creating terminal 1640 is referred to as a finalized document author 1641. The finalized document creating terminal 1640 will be described later in detail with reference to FIG. 20.

<Functional Configuration of Photographing Terminal>

Figure 17:
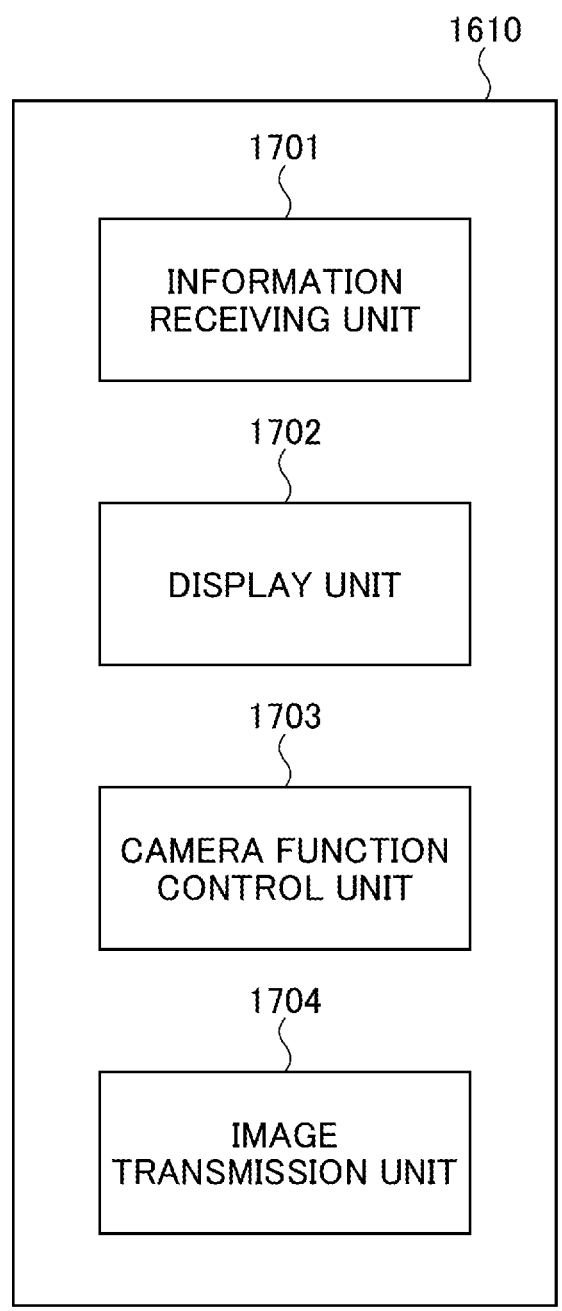
FIG. 17 is a diagram illustrating an example of a functional configuration of a photographing terminal.

FIG. 17 is a diagram illustrating an example of a functional configuration of the photographing terminal. As illustrated in FIG. 17, the photographing terminal 1610 includes an information receiving unit 1701, a display unit 1702, a camera function control unit 1703, an image transmission unit 1704. These functions of the photographing terminal 1610 are implemented by the photographing terminal 1610 executing a program.

The information receiving unit 1701 receives, from the server apparatus 1620, position information and use information about image data to be captured and inserted into a plurality of formats (for example, the format for subsidy A, the format for customer B, and the like) selected from a plurality of types of formats for generating construction photograph ledger data. Further, the information receiving unit 1701 receives precautions to be taken when generating construction photograph ledger data (for example, precautions to be taken when capturing image data) from the server apparatus 1620.

The display unit 1702 displays the position information and the use information received from the server apparatus 1620. Further, the display unit 1702 displays the precautions to be taken when generating construction photograph ledger data (for example, precautions to be taken when capturing image data), received from the server apparatus 1620.

The camera function control unit 1703 controls so as to display lines for determining the position of a photographing object on a photographing screen when a screen transitions to the photographing screen. Further, in order to reduce the influence of camera shake when image data is captured, the camera function control unit 1703 corrects the captured image data.

The image transmission unit 1704 transmits the captured image data, captured by the photographing terminal 1610, to the server apparatus 1620.

<Functional Configuration of Server Apparatus>

Figure 18:
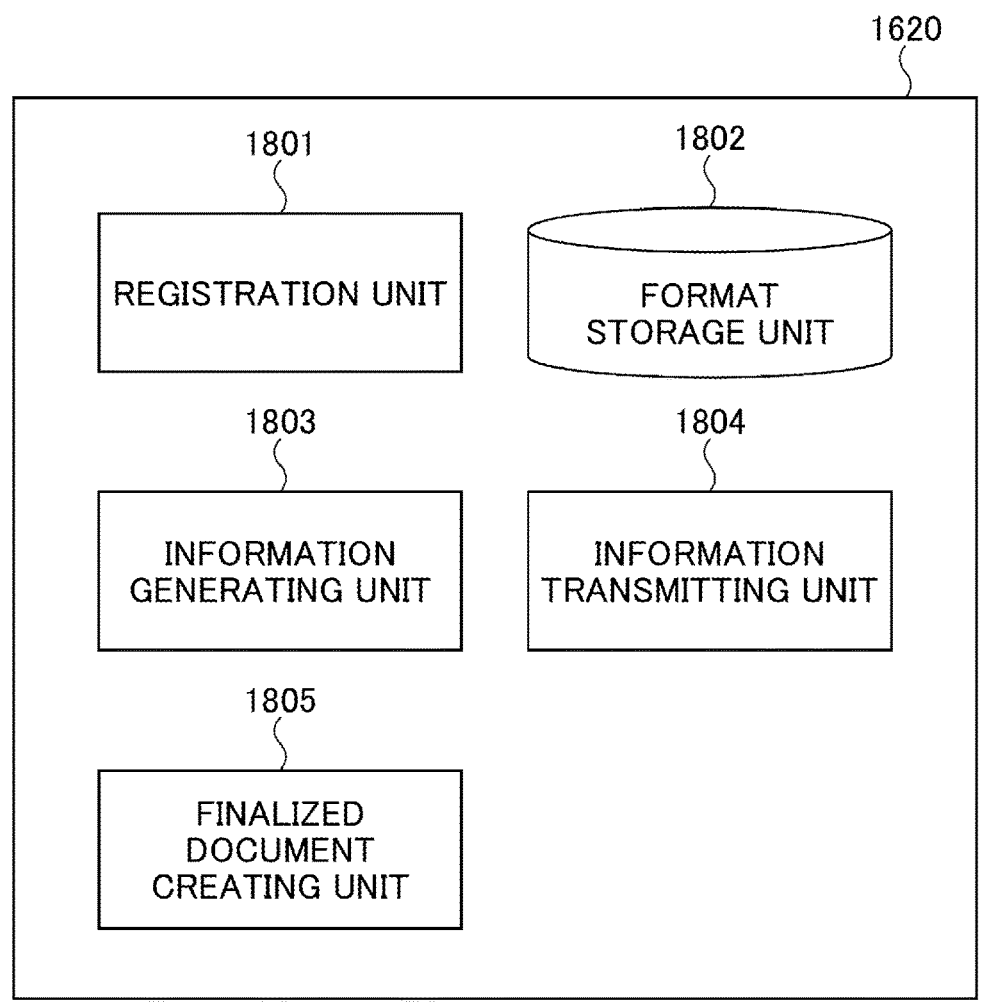
FIG. 18 is a diagram illustrating an example of a functional configuration of a server apparatus.

FIG. 18 is a diagram illustrating an example of a functional configuration of the server apparatus. The server apparatus 1620 includes a registration unit 1801, an information generating unit 1803, an information transmitting unit 1804, and a finalized document creating unit 1805. These functions of the server apparatus 1620 are implemented by the server apparatus 1620 executing a program. Further, the server apparatus 1620 includes a format storage unit 1802. The format storage unit 1802 is implemented by an auxiliary storage device (such as an auxiliary storage device 2704 of FIG. 27) of the server apparatus 1620.

The registration unit 1801 receives, from the registration terminal 1630, position information indicating a photographing location (such as "roof/ceiling", "air conditioning equipment (heat source equipment), and "air conditioning equipment+lighting equipment") where image data (inserted into each format) is to be captured. Further, the registration unit 1801 links property information (for example, information about a property (such as a building) where a device such as an air conditioner is installed) with position information of image data to be captured and inserted into a plurality of types of formats for generating construction photograph ledger data. Then, the registration unit 1801 stores the property information linked with the position information in the format storage unit 1802.

Further, the registration unit 1801 stores captured image data, captured by the photographing terminal 1610, in the format storage unit 1802.

The format storage unit 1802 stores a plurality of formats (for example, a format for each subsidy, a format for each customer, and the like) for generating construction photograph ledger data. As described above, each of the formats includes position information and use information about image data to be captured and inserted into construction photograph ledger data. Further, each of the formats includes precautions to be taken when generating construction photograph ledger data.

Each of the formats stored in the format storage unit 1802 may be construction photograph ledger data that has already been generated (i.e., a format into which captured image data has already been inserted), or may be construction photograph ledger data that is still being generated (i.e., a format into which captured image data has not yet been inserted).

For example, if a format is for generating construction photograph ledger data attached to a subsidy application form, at least one of construction photograph ledger data in the case of a subsidy being provided, construction photograph ledger data in the case of no subsidy being provided, and construction photograph ledger data into which captured image data is yet to be inserted is stored in the format storage unit 1802. That is, in the present embodiment, a plurality of persons can share construction photograph ledger data generated by other persons and attached to various subsidy application forms. Examples of such construction photograph ledger data include construction photograph ledger data into which captured image data has been inserted (in the case of a subsidy being provided/no subsidy being provided), and construction photograph ledger data into which construction photograph ledger data is yet to be inserted.

Further, the format storage unit 1802 stores captured image data, captured by the photographing terminal 1610.

The format storage unit 1802 is configured to permit access from a person having permission to share a format when the format is accessed. That is, only a person having a predetermined sharing permission can access a predetermined format (for example, a format shared within a company, a format shared within group companies, and the like) stored in the format storage unit 1802.

The information generating unit 1803 generates position information and use information to be transmitted to the photographing terminal 1610. Specifically, from among a plurality of types of formats stored in the format storage unit 1802, the information generating unit 1803 selects a plurality of formats in which position information has been registered by the registration terminal 1630 (that is, a plurality of formats into which image data captured by the photographing terminal 1610 is to be inserted). The information generating unit 1803 generates position information about image data to be captured and inserted into at least one of the plurality of formats in which the position information has been registered by the registration terminal 1630. Further, based on the plurality of formats in which the position information has been registered by the registration terminal 1630, the information generation unit 1803 generates use information about the image data to be captured.

The information transmitting unit 1804 transmits the generated position information and use information to the photographing terminal 1610.

In response to a request from the finalized document creating terminal 1640, the finalized document creating unit 1805 transmits a format for generating finalized document data to the finalized document creating terminal 1640. Further, the finalized document creating unit 1805 receives finalized document data (for example, finalized document data that includes construction photograph ledger data into which captured image data has already been inserted), generated by the finalized document creating terminal 1640, from the finalized document creating terminal 1640. The finalized document creating unit 1805 stores construction photograph ledger data (that is, construction photograph ledger data into which captured image data has already been inserted), included in the received finalized document data, in the format storage unit 1802. Further, the finalized document creating unit 1805 can receive precautions to be taken when generating construction photograph ledger data from the finalized document creating terminal 1640. The finalized document creating unit 1805 links the received precautions with the format, and stores the precautions linked with the format in the format storage unit 1802.

<Functional Configuration of Registration Terminal>

Figure 19:
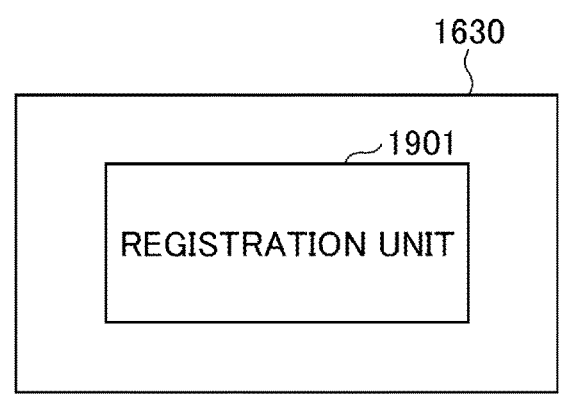
FIG. 19 is a diagram illustrating an example of a functional configuration of a registration terminal.

FIG. 19 is a diagram illustrating an example of a functional configuration of the registration terminal. The registration terminal 1630 includes a registration unit 1901. The function of the registration terminal 1630 is implemented by the registration terminal 1630 executing a program.

In response to an instruction from the registrant 1631, the registration unit 1901 selects a format (for example, the format for subsidy A) in which position information is to be registered.

If formats in which position information is to be registered have already been stored in the server apparatus 1620, the registration unit 1901 selects a format, in which position information is to be registered, from the formats stored in the server apparatus 1620.

If formats in which position information is to be registered have not yet been stored in the server apparatus 1620 (that is, if the registrant 1631 is the first registrant who register this type of format), the registration unit 1901 selects a format generated by the registrant 1631 as a format in which position information is to be registered. For example, the registrant 1631 reads guidelines for creating subsidy application forms, and creates a format. Note that an administrator or the like may check whether the format to be registered is appropriate.

The registration unit 1901 receives an input of position information (for example, "roof/ceiling", "air conditioning equipment (heat source equipment), "air conditioning equipment+lighting equipment", and the like) about image data to be captured and inserted into the selected format (for example, the format for subsidy A). Further, the registration unit 1901 transmits the position information, about image data to be captured and inserted into the format, to the server apparatus 1620. Further, the registration unit 1901 transmits precautions to be taken when generating construction photograph ledger data, which have been input by the registrant 1631, to the server apparatus 1620.

<Functional Configuration of Finalized Document Creating Terminal>

Figure 20:
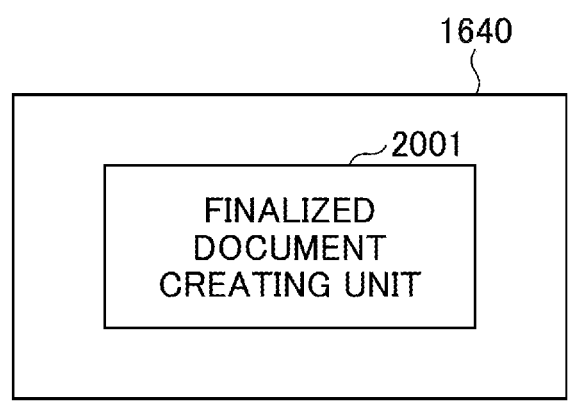
FIG. 20 is a diagram illustrating an example of a functional configuration of a finalized document creating terminal.

FIG. 20 is a diagram illustrating an example of a functional configuration of the finalized document creating terminal. The finalized document creating terminal 1640 includes a finalized document creating unit 2001. The function of the finalized document creating terminal 1640 is implemented by the finalized document creating terminal 1640 executing a program.

The finalized document creating unit 2001 receives a format, used by the finalized document author 1641 to create finalized document data, from the server apparatus 1620. Further, the finalized document creating unit 2001 generates finalized document data. The finalized document creating unit 2001 transmits the generated finalized document data to the server apparatus 1620. Further, the finalized document creating unit 2001 can transmit precautions to be taken when generating construction photograph ledger data, which have been input by the finalized document author 1641, to the server apparatus 1620.

<Flow of Finalized Document Generating Process>

Figure 21:
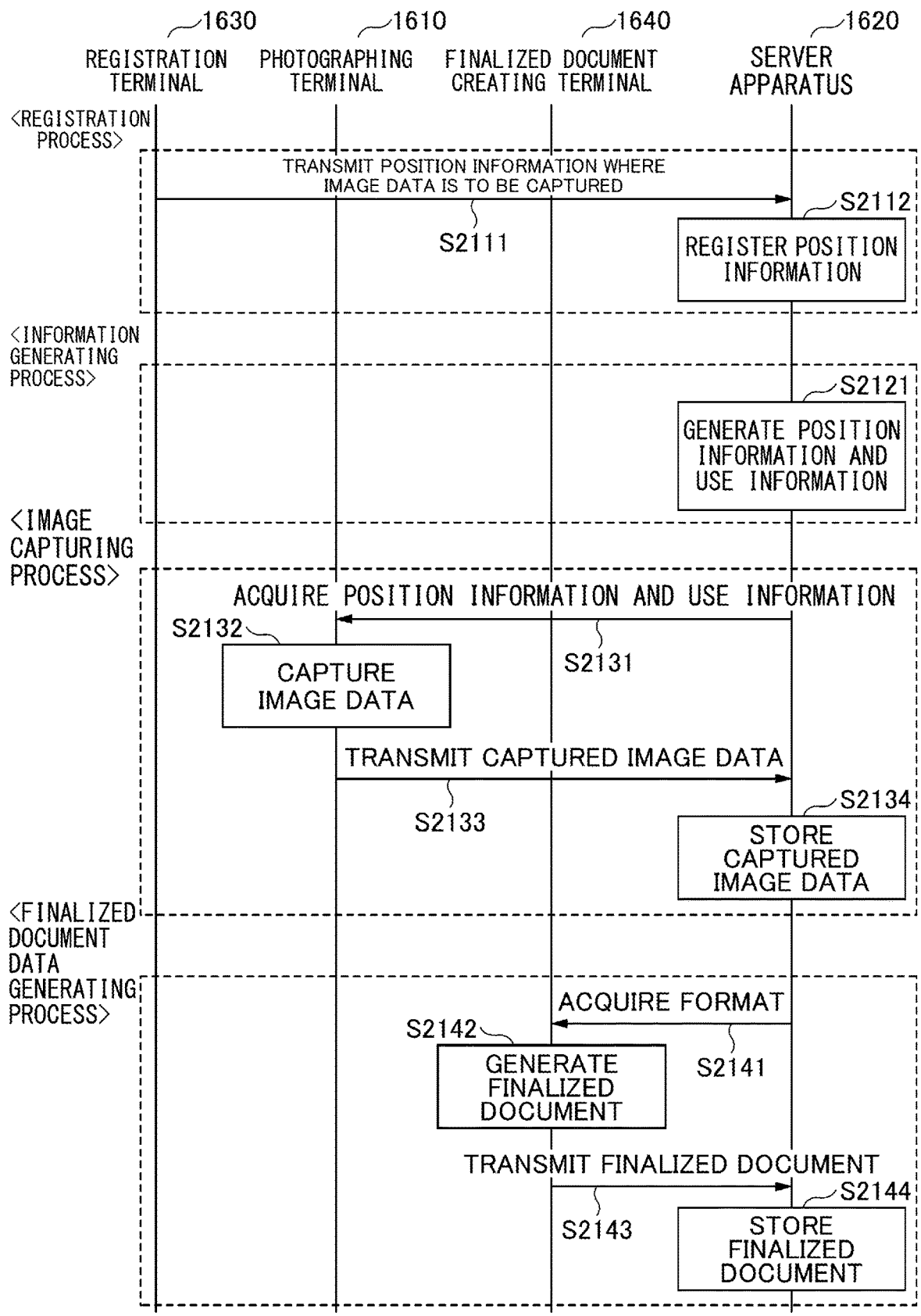
FIG. 21 is a sequence diagram illustrating an example of a flow of a finalized document generating process.

FIG. 21 is a sequence diagram illustrating an example of a flow of a finalized document generating process. In the following, a registration process (steps S2111 to S2112), an information generating process (step S2121), and an image capturing process (steps S2131 to S2134) included in the finalized document generating process (steps S2141 to S2144) will be described separately.

(1) Registration Process

In step S2111, the registration terminal 1630 transmits, to the server apparatus 1620, property information (for example, information about a property (such as a building) where a device such as an air conditioner is installed) and position information about each piece of image data to be captured and inserted into a plurality of types of formats. The plurality of types of formats are used to generate construction photograph ledger data at the time of construction of the building.

In step S2112, the server apparatus 1620 stores the position information about the pieces of image data (to be captured and inserted into the formats), received in step S2111, in the format storage unit 1802 of the server apparatus 1620.

(2) Information Generating Process

In step S2121, the server apparatus 1620 generates position information and use information to be transmitted to the photographing terminal 1610. Specifically, the server apparatus 1620 generates position information about image data to be captured and inserted into at least one of a plurality of formats in which position information has been registered by the registration terminal 1630 (that is, at least one of a plurality of formats into which image data captured by the photographing terminal 1610 is to be inserted). Further, based on the plurality of formats in which the position information has been registered by the registration terminal 1630, the server apparatus 1620 generates use information about the image data to be captured.

(2) Image Capturing Process

In step S2131, the photographing terminal 1610 receives, from the server apparatus 1620, the position information and the use information about the image data to be captured and inserted into at least one of the plurality of formats (for example, the format for subsidy A and the format for customer B) selected from the plurality of types of formats for generating construction photograph ledger data. Further, the photographing terminal 1610 displays the use information about the image data to be captured. Further, the photographing terminal 1610 receives precautions to be taken when generating construction photograph ledger data (for example, precautions to be taken when capturing image data), which constitutes a part of a finalized document, from the server apparatus 1620.

For example, the server apparatus 1620 transmits, to the photographing terminal 1610, position information and use information about property information (for example, information about a property (such as a building) where a device such as an air conditioner is installed) specified from the photographing terminal 1610.

In step S2132, the photographing terminal 1610 captures image data. For example, the photographing terminal 1610 captures image data by the photographer 1611 operating the photographing terminal 1610 at location(s) indicated by the position information transmitted in step S2131.

In step S2133, the photographing terminal 1610 transmits the captured image data, captured in step S2132, to the server apparatus 1620.

In step S2134, the server apparatus 1620 stores the captured image data, received in the step S2133, in the format storage unit 1802 of the server apparatus 1620.

(3) Finalized Document Data Generating Process

In step S2141, the finalized document creating terminal 1640 acquires a format, used by the finalized document author 1641 to generate finalized document data, from the server apparatus 1620.

In step S2142, the finalized document creating terminal 1640 generates finalized document data. For example, the finalized document author 1641 operates the finalized document creating terminal 1640 such that captured image data (captured by the photographing terminal 1610) acquired from the server apparatus 1620 is inserted into a predetermined portion of the format of construction photograph ledger data, acquired in step S2141. At this time, the finalized document creating terminal 1640 may display precautions to be taken when generating construction photograph ledger data (for example, precautions to be taken when creating documents).

Note that when the finalized document author 1641 generates construction photograph ledger data, the finalized document author 1641 may cause the finalized document creating terminal 1640 to display construction photograph ledger data that has been generated by any other person and stored in the server apparatus 1620 (that is, construction photograph ledger data into which captured image data has already been inserted) or construction photograph ledger data that is still being generated (that is, construction photograph ledger data into which captured image data is yet to be inserted), so as to view the construction photograph ledger data. For example, when the finalized document author 1641 generates construction photograph ledger data attached to a subsidy application form, the finalized document author 1641 may display and view at least one of construction photograph ledger data in the case of a subsidy being provided, construction photograph ledger data in the case of no subsidy being provided, and construction photograph ledger data into which captured image data is yet to be inserted.

In step S2143, the finalized document creating terminal 1640 transmits a finalized document, including the construction photograph ledger data generated in step S2142 (that is, a finalized document including the construction photograph ledger data into which the captured image data has already been inserted), to the server apparatus 1620. Further, the finalized document creating terminal 1640 can transmit precautions to be taken when generating construction photograph ledger data, which have been input by the finalized document author 1641, to the server apparatus 1620.

In step S2144, the server apparatus 1620 stores, in the format storage unit 1802 of the server apparatus 1620, the construction photograph ledger data that constitutes a part of the finalized document received in step S2143 (that is, the construction photograph ledger data into which the captured image data has already been inserted). Further, the server apparatus 1620 links the format with the precautions received in step S2143, and stores the format linked with the precautions in the format storage unit 1802 of the server apparatus 1620.

Instead of the finalized document author 1641 performing an operation for inserting captured image data into a predetermined portion of a format as described above, the server apparatus 1620 may be configured to automatically insert captured image data into a predetermined portion of a format based on information that links the captured image data with each portion of the format. Details will be described below.

The server apparatus 1620 assigns identifiers (hereinafter also referred to as "attribute information") to respective portions of a format, into which captured image data is to be inserted, and manage the identifiers. The photographing terminal 1610 assigns, to captured image data, attribute information of a portion of the format, into which the captured image data is to be inserted. The server apparatus 1620 inserts the captured image data into the portion of the format by referring to the attribute information assigned to the captured image data captured by the photographing terminal 1610. Accordingly, in the present embodiment, the server apparatus 1620 can automatically generate a plurality of pieces of construction photograph ledger data in response to image data being captured.

<Details of Each Process>

Next, each of the processes included in the finalized document generating process will be described in detail.

(1) Details of Registration Process

Figure 22:
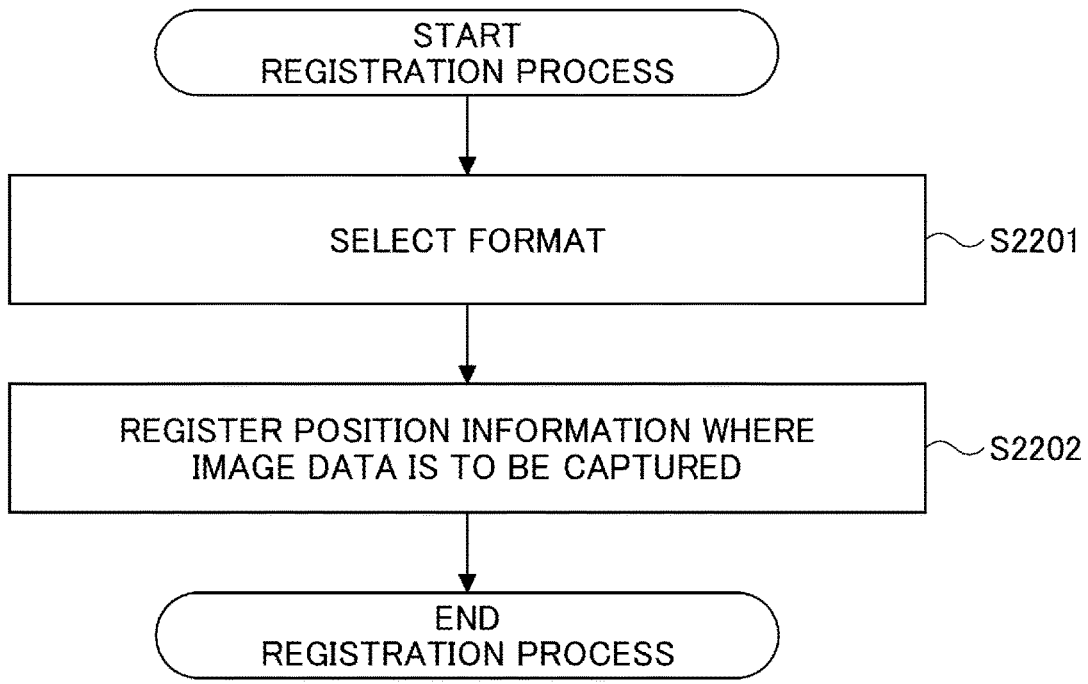
FIG. 22 is a flowchart illustrating an example of a flow of a registration process.

FIG. 22 is a flowchart illustrating an example of a flow of the registration process. In step S2201, in response to an instruction from the registrant 1631, the registration unit 1901 of the registration terminal 1630 selects a format (for example, the format for subsidy A) in which position information is to be registered.

If formats in which position information is to be registered have already been stored in the server apparatus 1620, the registration unit 1901 of the registration terminal 1630 selects a format, in which position information is to be registered, from the formats stored in the server apparatus 1620.

If formats in which position information is to be registered have not yet been stored in the server apparatus 1620 (that is, if the registrant 1631 is the first registrant who register this type of format), the registration unit 1901 selects a format generated by the registrant 1631 as a format in which position information is to be registered. For example, the registrant 1631 reads guidelines for creating subsidy application forms, and create a format.

In step S2202, the registration unit 1901 of the registration terminal 1630 receives an input of position information (for example, "roof/ceiling", "air conditioning equipment (heat source equipment), "air conditioning equipment+lighting equipment", and the like) about image data to be captured and inserted into the format (for example, the format for subsidy A) selected in step S2201. Further, the registration unit 1901 of the registration terminal 1630 transmits the position information about image data to be captured and inserted into the format, to the server apparatus 1620. Further, the registration unit 1901 of the registration terminal 1630 can transmit precautions to be taken when generating construction photograph ledger data, which have been input by the registrant 1631, to the server apparatus 1620.

(2) Details of Information Generating Process

Figure 23:
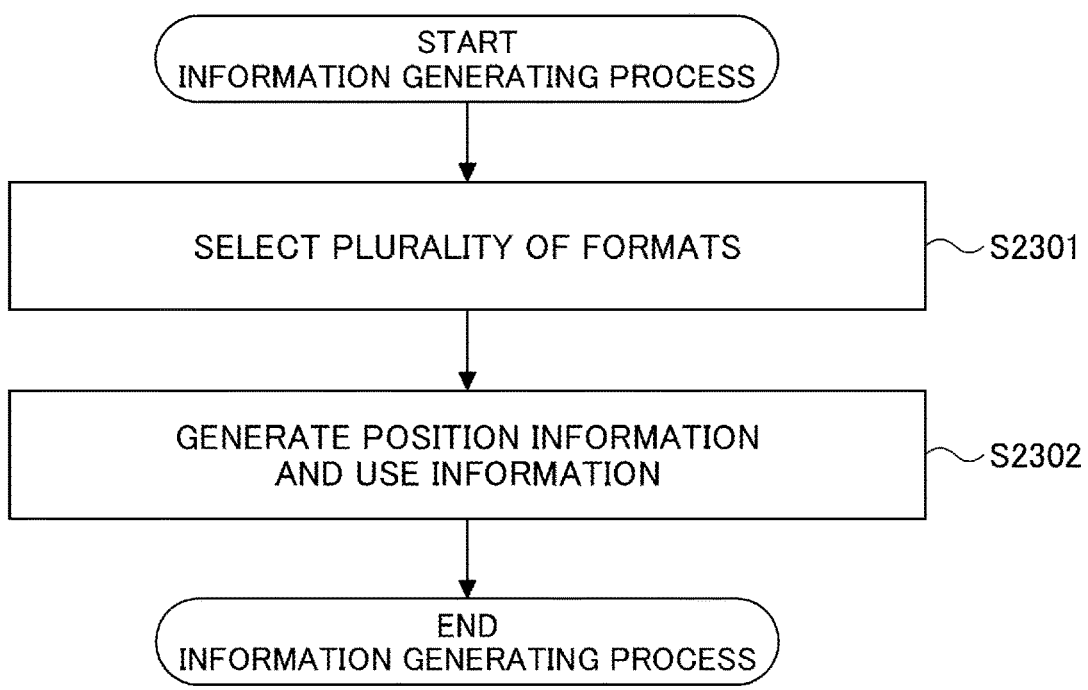
FIG. 23 is a flowchart illustrating an example of a flow of an information generating process.

FIG. 23 is a flowchart illustrating an example of a flow of the information generating process. In step S2301, from among a plurality of types of formats stored in the format storage unit 1802, the information generating unit 1803 of the server apparatus 1620 selects a plurality of formats in which position information has been registered by the registration terminal 1630 (that is, a plurality of formats into which image data captured by the photographing terminal 1610 are to be inserted).

In step S2302, the information generating unit 1803 of the server apparatus 1620 generates position information about image data to be captured and inserted into at least one of the plurality of formats selected in step S2301. Further, the information generation unit 1803 generates use information about the image data to be captured, based on the plurality of formats in which the position information has been registered by the registration terminal 1630.

(3) Details of Image Capturing Process

Figure 24:
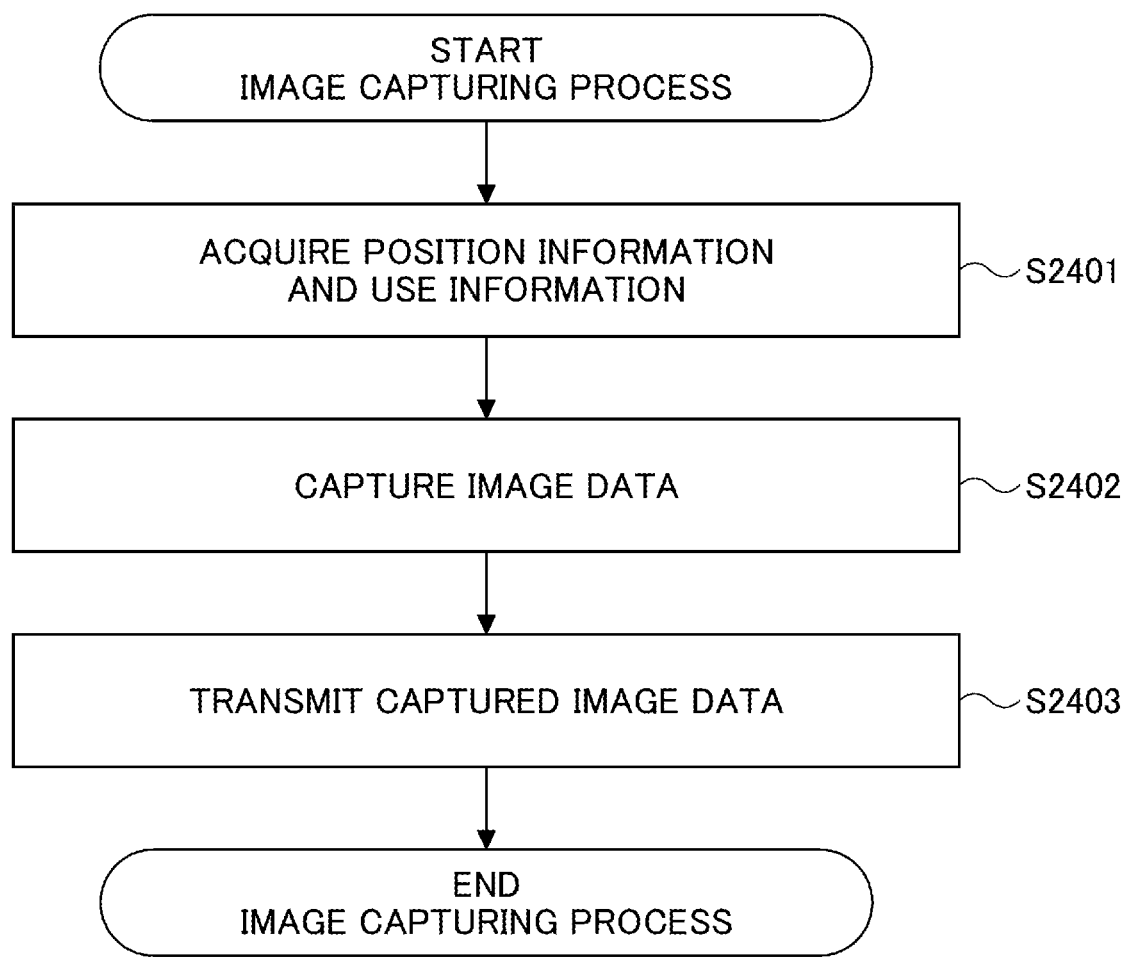
FIG. 24 is a flowchart illustrating an example of a flow of an image capturing process.

FIG. 24 is a flowchart illustrating an example of a flow of the image capturing process. In step S2401, the information receiving unit 1701 of the photographing terminal 1610 receives, from the server apparatus 1620, the position information and the use information about the image data to be captured and inserted into at least one of the plurality of formats (such as the format for subsidy A and the format for customer B) selected from the plurality of types of formats for generating construction photograph ledger data. Further, the display unit 1702 of the photographing terminal 1610 displays the use information about the image data to be captured. Further, the information receiving unit 1701 of the photographing terminal 1610 receives precautions to be taken when generating construction photograph ledger data (for example, precautions to be taken when capturing image data) from the server apparatus 1620, and the display unit 1702 of the photographing terminal 1610 displays the precautions received by the information receiving unit 1701.

In step S2402, the photographing terminal 1610 captures image data. For example, the photographing terminal 1610 captures image data by the photographer 1611 operating the photographing terminal 1610 at location(s) indicated by the position information transmitted in step S2401.

In step S2403, the image transmission unit 1704 of the photographing terminal 1610 transmits the captured image data, captured in step S2402, to the server apparatus 1620.

(4) Details of Finalized Document Data Generating Process

Figure 25:
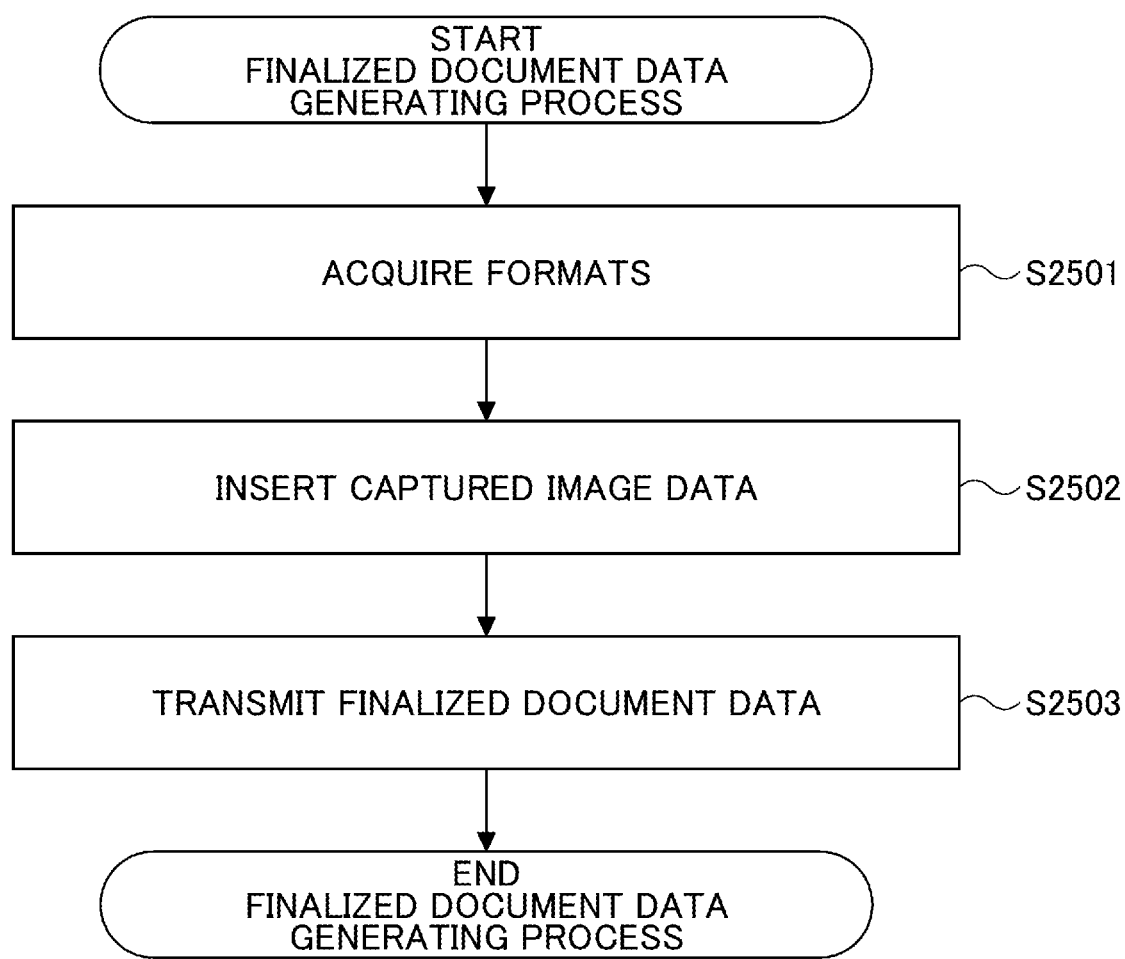
FIG. 25 is a flowchart illustrating an example of a flow of a finalized document data generating process.

FIG. 25 is a flowchart illustrating an example of a flow of the finalized document data generating process. In step S2501, the finalized document creating unit 2001 of the finalized document creating terminal 1640 receives a format used by the finalized document author 1641 to generate finalized document data from the server apparatus 1620.

In step S2502, the finalized document creating unit 2001 of the finalized document creating terminal 1640 generates finalized document data. The finalized document author 1641 operates the finalized document creating terminal 1640 such that captured image data (captured by the photographing terminal 1610) acquired from the server apparatus 1620 is inserted into a predetermined portion of the format, which is for generating construction photograph ledger data, received in step S2501.

In step S2503, the finalized document creating unit 2001 of the finalized document creating terminal 1640 transmits the finalized document data generated in step S2502 to the server apparatus 1620. Note that the finalized document creating unit 2001 of the finalized document creating terminal 1640 may transmit precautions to be taken when generating construction photograph ledger data, which have been input by the finalized document author 1641, to the server apparatus 1620.

<Specific Examples of Position Information and Use Information>

FIG. 26 is a diagram illustrating specific examples of position information and use information. A case in which both construction photograph ledger data of format A (for example, the format for subsidy A) and construction photograph ledger data of format B (for example, the format for customer B) are generated at one construction will be described.

The registration terminal 1630 registers, in the server apparatus 1620, position information about image data to be captured and inserted into the format A and position information about image data to be captured and inserted into the format the format B. Specifically, in the example illustrated in the upper left of FIG. 26, position information about image data to be captured and inserted into the format A is "roof/ceiling [before construction]", "roof/ceiling [during construction]", "roof/ceiling [after construction]", "air conditioning equipment (heat source equipment) [before construction]", "air conditioning equipment (heat source equipment) [during construction]", "air conditioning equipment (heat source equipment) [after construction]", "air conditioning equipment+lighting equipment [before construction] ", "air conditioning equipment+lighting equipment [during construction]", and "air conditioning equipment+lighting equipment [after construction]". Further, in the example illustrated in the upper right of FIG. 26, position information about image data to be captured and inserted into the format B is "air conditioning equipment (heat source equipment) [before construction]", "air conditioning equipment (heat source equipment) [during construction]", "air conditioning equipment (heat source equipment) [after construction]", "air conditioning equipment+lighting equipment [before construction]", "air conditioning equipment+lighting equipment [during construction]," and "air conditioning equipment+lighting equipment [after construction]".

The server apparatus 1620 generates position information and use information to be transmitted to the photographing terminal 1610. Specifically, the server apparatus 1620 generates position information about image data to be captured and inserted into at least one of a plurality of formats (that is, at least one of the format A and the format B) in which position information has been registered by the registration terminal 1630. Further, based on the plurality of formats in which the position information has been registered by the registration terminal 1630, the server apparatus 1620 generates use information about the image data to be captured. For example, in the example of FIG. 26, the use of image data to be captured at each of "roof/ceiling [before construction]", "roof/ceiling [during construction]", and "roof/ceiling [after construction]" is for the format A (for "subsidy A"). Further, the use of image data to be captured at each of "air conditioning equipment (heat source equipment) [before construction]", "air conditioning equipment (heat source equipment) [during construction]" "air conditioning equipment (heat source equipment) [after construction]" "air conditioning equipment+lighting equipment [before construction]", "air conditioning equipment+lighting equipment [during construction]", and "air conditioning equipment+ lighting equipment [after construction]" is for both the format A and the format B (for both "subsidy A" and "customer B").

Accordingly, when the photographer 1611 captures image data, the photographer 1611 can know the use of the image data (for example, the use of the image data is for "subsidy A", for "customer B", or for both "subsidy A and customer B"). Further, the finalized document author 1641 can refer to construction photograph ledger data generated by other persons.

<Hardware Configuration of Photographing Terminal, Server Apparatus, Registration Terminal, and Finalized Document Creating Terminal>

FIG. 27 is a diagram illustrating an example of a hardware configuration of each of the photographing terminal, the server apparatus, the registration terminal, and the finalized document creating terminal. Each of the photographing terminal 1610, the server apparatus 1620, the registration terminal 1630, and the finalized document creating terminal 1640 includes a central processing unit (CPU) 2701, a read-only memory (ROM) 2702, and a random-access memory (RAM) 2703. The CPU 2701, the ROM 2702 and the RAM 2703 form what is referred to as a computer.

Further, each of the photographing terminal 1610, the server apparatus 1620, the registration terminal 1630, and the finalized document creating terminal 1640 include an auxiliary storage device 2704, a display device 2705, an operation device 2706, an interface (I/F) device 2707, and a drive device 2708. The hardware elements of each of the photographing terminal 1610, the server apparatus 1620, the registration terminal 1630, and the finalized document creating terminal 1640 are connected to each other via a bus B.

The CPU 2701 is a calculation device that executes various programs installed in the auxiliary storage device 2704.

The ROM 2702 is a non-volatile memory. The ROM 2702 functions as a main storage device that stores various programs, data, and the like necessary for the CPU 2701 to execute various programs installed in the auxiliary storage device 2704. Specifically, the ROM 2702 functions as a main storage device that stores a boot program or the like, such as a basic input/output system (BIOS) or an extensible firmware interface (EFI).

The RAM 2703 is a volatile memory such as a dynamic random-access memory (DRAM) or a static random-access memory (SRAM). The RAM 2703 functions as a main storage device that provides a work area in which various programs installed in the auxiliary storage device 2704 are loaded when executed by the CPU 2701.

The auxiliary storage device 2704 is an auxiliary storage device that stores various programs and information used when the various programs are executed.

The display device 2705 is a display device that displays an internal state of each of the photographing terminal 1610, the server apparatus 1620, the registration terminal 1630, and the finalized document creating terminal 1640.

The operation device 2706 is an input device used when an administrator of each of the photographing terminal 1610, the server apparatus 1620, the registration terminal 1630, and the finalized document creating terminal 1640 inputs various instructions into each of the photographing terminal 1610, the server apparatus 1620, the registration terminal 1630, and the finalized document creating terminal 1640.

The I/F device 2707 is a communication device that is connected to a network and communicates with the photographing terminal 1610, the server apparatus 1620, the registration terminal 1630, the finalized document creating terminal 1640, and the like.

The drive device 2708 is a device for setting a recording medium 2709. The recording medium 2709 includes a medium for optically, electrically, or magnetically recording information, such as a CD-ROM, a flexible disk, or a magneto-optical disc. Further, the recording medium 2709 may include a semiconductor memory or the like that electrically records information, such as a ROM, a flash memory, or the like.

Various programs to be installed in the auxiliary storage device 2704 are installed by, for example, setting the distributed recording medium 2709 in the drive device 2708 and reading the various programs recorded in the recording medium 2709 by the drive device 2708. Alternatively, various programs to be installed in the auxiliary storage device 2704 may be installed by being downloaded from the network via the I/F device 2707.

Note that a camera built in the photographing terminal 1610 or a camera connected to the photographing terminal 1610 captures image data. That is, the photographing terminal 1610 may be configured to include a built-in camera (that is, the photographing terminal 1610 and the camera are integrated into one device), or the photographing terminal 1610 may be connected with a camera (that is, the photographing terminal 1610 and the camera are separate devices).

Although embodiments have been described above, it will be understood that various changes in form and detail may be made without departing from the spirit and scope of the claims.

This application is based on and claims priority to Japanese Patent Application No. 2020-035932, filed on Mar. 3, 2020, and Japanese Patent Application No. 2020-035935, filed on Mar. 3, 2020, the entire contents of which are incorporated herein by reference.

DESCRIPTION OF THE REFERENCE NUMERALS

100: task support system
110: information input apparatus
120: server apparatus
121: registration unit
122: application providing unit
123: attribute information providing unit
124: rule acquiring unit
125: construction photograph acquiring unit
126: finalized document generating unit
140: information output apparatus
150: terminal device
200: finalized document
610: constructor information
620: application information
710: case information
720: location and device information 730: process and task information
740: photographing timing information
800: template
801: case name input field
802: construction photograph insertion field
803: attribute information input field
810: pre-insertion information
910: image data
911: blackboard information
920: captured image data
921: header section
922: body section
1310, 1320: construction photograph ledger data
1311, 1312: captured image data
1321, 1322, 1323: captured image data

The invention claimed is:

1. A task support apparatus comprising:
   circuitry, the circuitry being configured to:
   acquire a plurality of captured images associated with pieces of attribute information including a plurality of attributes;
   acquire a description rule of a document for reporting a construction status;
   generate image information based on the pieces of attribute information, associated with the acquired captured images, and the acquired description rule,
   wherein the description rule defines a plurality of groups and one or more subgroups of each group, based on a designated attribute,
   wherein the circuitry is further configured to, according to the description rule,
     classify the acquired captured images into the plurality of groups, based on a first attribute among the plurality of the attributes included in the attribute information in association with the acquired captured images,
     classify one or more captured images classified into each group of the plurality of groups into the one or more subgroups, based on a second attribute among the plurality of attributes included in the attribute information that is in association with the classified captured images, and
     select one or more of the acquired captured images, for each group and each subgroup, to generate the image information based on the selected one or more captured images.

2. The task support apparatus according to claim 1, wherein the circuitry is further configured to generate the image information based on an insertion rule, the insertion rude includes an insertion order, and the insertion order is determined by the construction detail or the photographing timing included in each of the pieces of attribute information.

3. The task support apparatus according to claim 1, wherein each of the pieces of attribute information further includes information for identifying a constructor, information for identifying a photographer, evaluation on a captured image, information for identifying a photographing date and time, and information relating to a construction observer.

4. The task support apparatus according to claim 1, wherein the circuitry is further configured to provide the construction detail and the photographing timing to the terminal device, and
   wherein the terminal device includes a second circuitry configured to capture an image.

5. The task support apparatus according to claim 1, wherein the circuitry is further configured to:
   select, in a case where a plurality of captured images are associated with same attribute information and are displayed as selection candidates at the time when the image information is generated, one captured image from among the plurality of captured images displayed as the selection candidates, and
   display, in a case where an additional captured image is associated with the same attribute information after selecting the one captured image, the additional captured image and the selected one captured image as selection candidates.

6. A non-transitory recording medium storing a program for causing a computer to execute a method, the method comprising:
   acquiring a plurality of captured images associated with pieces of attribute information including a plurality of attributes;
   acquiring a description rule of a document for reporting a construction status, the description rule defining a plurality of groups and one or more subgroups of each group, based on a designated attribute,
   generating image information based on the pieces of attribute information, associated with the acquired captured images, and the acquired description rule;
   classifying, according to the description rule, the acquired captured images into the plurality of groups, based on a first attribute among the plurality of attributes included, in the attribute information that is in association with the acquired captured images;
   classify, according to the description rule, one or more captured images classified into each group of the plurality of groups into the one or more subgroups, based on a second attribute among the plurality of attributes included in the attribute information in association with the classified captured images; and
   selecting, according to the description rule, one or more of the acquired captured images, for each group and each subgroup, to generate the image information based on the selected one or more captured images.

* * * * *